United States Patent [19]
Nosaki et al.

[11] Patent Number: 5,673,373
[45] Date of Patent: Sep. 30, 1997

[54] IMAGE FORMING SYSTEM WITH SECURITY FUNCTION

[75] Inventors: Takefumi Nosaki; Toshiharu Takahashi, both of Kanagawa-ken, Japan

[73] Assignee: Kabushiki Kaisha Toshiba, Kawasaki, Japan

[21] Appl. No.: 528,492

[22] Filed: Sep. 14, 1995

[30] Foreign Application Priority Data

Oct. 6, 1994 [JP] Japan .................. 6-242996

[51] Int. Cl.$^6$ .................. G06K 15/02
[52] U.S. Cl. .................. 395/114; 395/115
[58] Field of Search .................. 395/114, 115; 358/401, 402, 403, 407, 468, 296, 300

[56] References Cited

FOREIGN PATENT DOCUMENTS 2-301877  12/1990  Japan.
6-103008   4/1994  Japan.

*Primary Examiner*—Scott A. Rogers
*Attorney, Agent, or Firm*—Foley & Lardner

[57] ABSTRACT

An image forming system with security includes a receiving section to receive print data with data showing secrecy attached from external equipment, a page memory to store image data rasterized from the print data received by the receiving section, transmit section to transmit termination data showing the termination of the rasterizing operation and an input section to input data specifying the image data. The image forming system further includes an image forming section to form image on paper based on the image data stored in the page memory when specific data is input by the input section after the transmit section transmits the termination data.

27 Claims, 24 Drawing Sheets

IMAGE FORMING SYSTEM WITH SECURITY FUNCTION

BACKGROUND OF THE INVENTION

1. Field of the Invention

The present invention relates to an image forming system with the security function to output images produced by terminals of personal computers, etc. through printers connected to such a network as LAN, etc.

2. Description of the Related Art

A network print system to output images produced by terminals of personal computers, etc. through printers connected to such a network as LAN, etc. has been put to practical use recently.

In such the network print system, a printer receives print data sent from terminals of personal computers connected to the network, rasterizes the received print data to print images, forms the rasterized images on such media as paper, etc. and outputs them.

In such the network print system, the printer merely prints plural print data sent from plural terminals connected to the network in order of reception. In this case, sending users are conscious of only when independent data of each user, for instance, user code, etc. is processed, that is, it is printed and output as a cover sheet prior to the printing of images according to the received print data.

However, this level of process is very questionable when secret information, etc. is printed for a single user especially when plural users are commonly using the same printer in a network, and it is necessary to wait for the print-out of secret information at the printer at the right time when the information is output to the printer.

However, the actual condition is that print data are not simply output as expected when print data are crowded and transmitted data are not readily output or instantly output if the printer is not busy.

On the other hand, a mail box sorter and the like are used to output printed matters in an independent bin for each sender of print data. However, this system will become very expensive because the number of bins equivalent to the number of users who use the printer jointly will become necessary.

As a result, a printer jointly usable in a network as well as capable of printing data while keeping secrecy and being inexpensive has been demand in recent years.

So, a network print system capable of printing data while keeping secrecy has been disclosed in the Japanese Patent Disclosure (Kokai) No. 06-103008. According to this disclosure, in a network which prints a print file sent from a work station by a commonly usable printer, if the print file is provided with a password, this print file is kept without being printed and the print operation begins only when the password is input by operator through the input section of the commonly usable printer.

In this disclosure, however, data is not rasterized until an operator inputs a password to the input section. Therefore, an operator has to wait by the side of the printer at least for a time required for rasterizing the data while the data is printed and output. For instance, an operator must wait for 30 seconds to several minutes to get the output of one A4 size sheet.

SUMMARY OF THE INVENTION

It is an object of the present invention to provide an image forming system with the security function capable of printing highly secret data with a commonly usable printer in a network while keeping secrecy and reducing a print waiting time of operator.

The present invention provides an image forming system with the security comprising means for receiving print data added with data showing security from an external equipment, means for rasterizing the print data received by the receiving means to image data, means for storing the image data rasterized by the rasterizing means, means for transmitting termination data showing the termination of the rasterizing operation of the rasterizing means, means for inputting data specifying the image data, and means for forming an image on paper based on the image data stored in the storing means when the specific data is input by the inputting means after the transmitting means transmits the termination data.

DETAILED DESCRIPTION OF THE PREFERRED EMBODIMENTS

Figure 1:
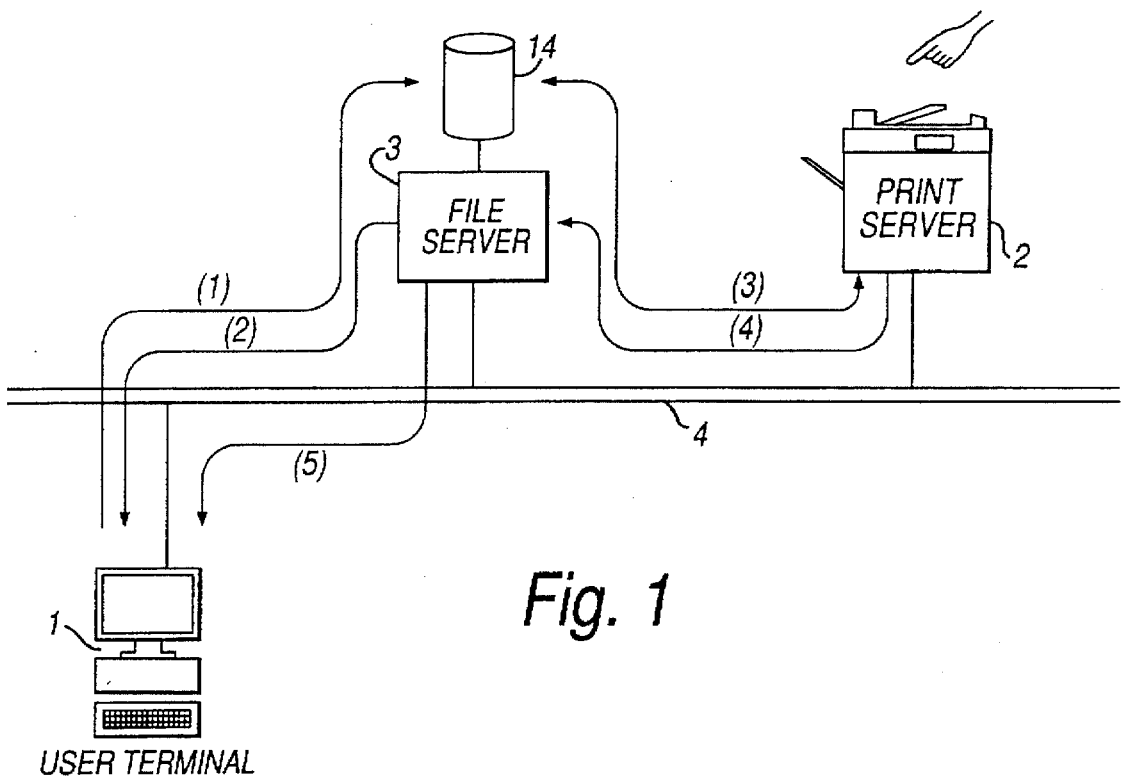
FIG. 1 is an outline diagram showing the brief configuration of an image forming system and the transmission procedure of data in one embodiment of the present invention.

Hereinafter, the preferred embodiments of the present invention will be explained referring to the drawings.

FIG. 1 shows a network print system. A terminal 1 and a print server 2 such as a digital copying machine, etc. are connected to this network print system via a network 4 which has a file server 3.

The terminal 1 is composed of, for instance, a personal computer, etc. comprising a keyboard, a display unit, a controller, transmission controller, etc.

Figure 2:
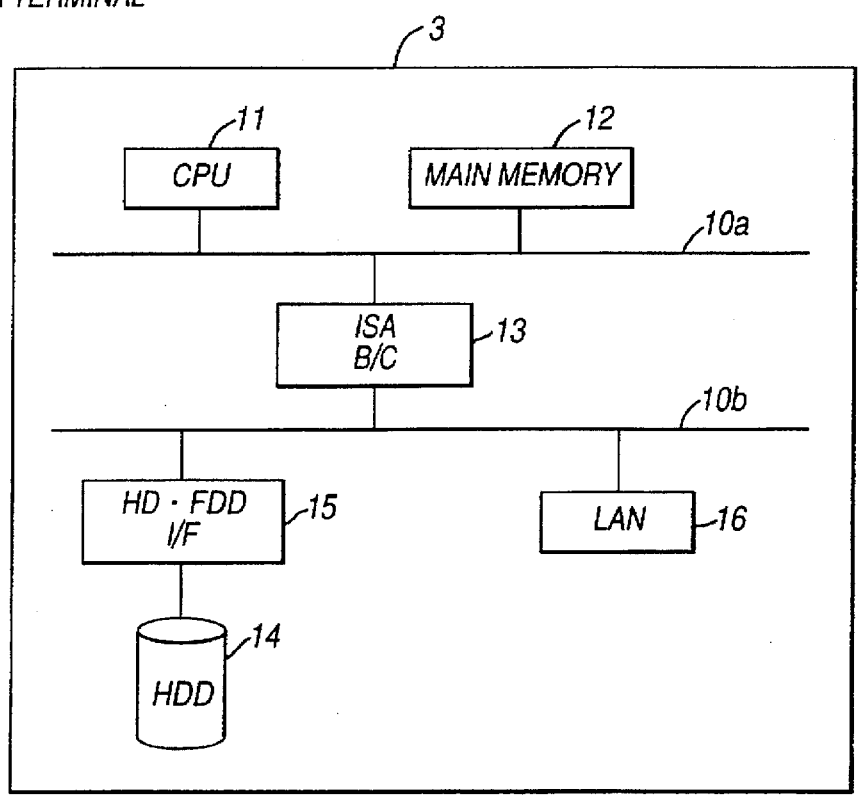
FIG. 2 is a block diagram for explaining the configuration of a file server.

The file server 3 as shown in FIG. 2, is composed of a CPU (a controller) 11 which controls devices in the file server 3 through a CPU local bus 10a, a main memory 12 which is used by the CPU 11, an ISA bus controller 13 which mediates between the CPU local bus 10a and a general purpose ISA bus 10b, an HDD (a storage means) 14 which is connected to the ISA bus 10b and stores image data electronically, an HD-FDD interface 15 which is an interface of the HDD, and a local area network circuit controller 16 for achieving the LAN function.

Print command data from the terminal 1 is recorded in the HDD 14 as a print queue. Further, if secret data is contained in the print command data, a correspondence table of print job numbers corresponding to user numbers is stored in the main memory 12.

The software of the file server 3 is composed of a network OS, file driver, LAN driver, memory driver, communication data manager, mail application, bulletin board application, commonly owned file software, print base section software, commonly owned print software and secret print software.

Figure 3:
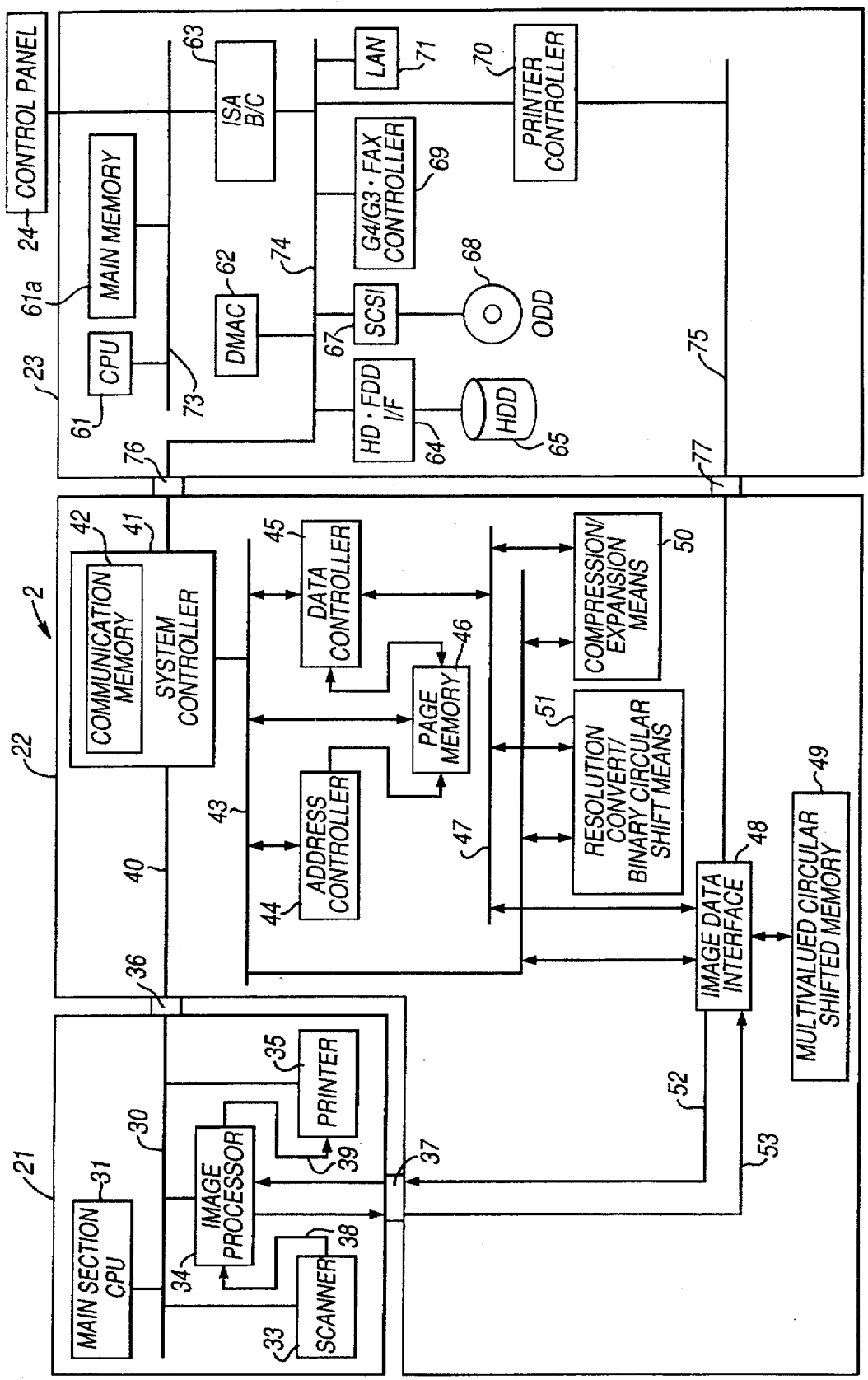
FIG. 3 is a block diagram for explaining the configuration of a print server.

The print server 2 comprises three large blocks; a main section 21, a page memory section 22 and a system section 23 as shown in FIG. 3. The main section 21 comprises a digital copying machine by connecting a scanner 33 and a printer 35 with an image processor 34. The page memory section 22 receives image data from the main section 21, stores this image data and transfers the stored image data again to the main section 21 to achieve the memory copy. The system section 23 comprises an hard disk (HD) as a secondary memory to store compressed image data of the page memory section 22, a FAX board (G4/G3·FAX controller) 69 to exchange compressed image data with the outside through a public telephone circuit, a LAN board (the local area network circuit controller) 71 to exchange data through the LAN, a system CPU 61 to control them through a system bus 73 and an ISA bus 74, a main memory 61a that is used by the system CPU 61 and a DMAC 62 to control the DMA transfer on the ISA bus 74, etc.

The main section 21 and the page memory section 22 are connected by a main section system interface 36 which exchanges control data and a main section image interface 37 which exchanges image data. Further, the page memory section 22 and the system section 23 are connected by a system section interface 76 which exchanges control data and a system section image interface 77 which exchanges image data. The main section 21 and the system section 23 have not been connected directly and control data and image data are exchanged always through the page memory section 22.

Next, the internal construction of the above three blocks will now be explained.

The main section 21 comprises the scanner (an input means) 33, the printer (an output means) 35, the image processor 34 and a main CPU (a controller) 31. The main CPU 31, the printer 35 and the image processor 34 are connected each other through the system bus 30.

The scanner 33 has a CCD line sensor (not shown) comprising plural light receiving elements arranged in series and reads an image of an original document placed on an original table (not shown) by every line according to a direction from the main CPU 31. Light and shade of the read image are converted into 8-bit digital data. This digital data is output to the image processor 34 as a time series digital data jointly with a sync signal through a scanner interface 38.

The main CPU 31 controls those units contained in the main section-21 and those units in the page memory section 22.

The page memory section 22 controls the communication of control information between the main CPU 31 in the main section 21 and the system CPU 61 in the system section 23. Further, the page memory section 22 controls the access to a page memory 46 from the main section 21 and the system section 23. The page memory section 22 further comprises a system controller 41, the page memory (a storage means) 46, an address controller 44, an image bus 47, a control bus 43, a data controller 45, an image data interface 48, a resolution convert/binary circular shift means 51, a compression/expansion means 50 and a multivalued circular shifted memory 49.

The system controller 41 is connected to the system bus 40 and has built-in a communication memory 42. The page memory 46 stores image data temporarily. The address controller 44 generates addresses of the page memory 46. The image bus 47 transfers data between the devices in the page memory section 22. The control bus 43 transfers control signals between the devices in the page memory section 22 and the system controller 41. The data controller 45 controls the data transfer between the page memory 46 and other devices via the image bus 47. The image data interface 48 mediates image data when transferring the image data to the main section 21 through the main section image interface 37. The resolution convert/binary circular shift means 51 converts image data to a resolution of another equipment when sending image data to the equipment having a different resolution or converts the image data received from an equipment having a different resolution to a resolution of the printer 35 of the main section 21 and executes a 90 degree circular shift process of binary image data. The compression/expansion means 50 compresses input image data for devices which transmit or store image data by compressing as in the facsimile transmission or optical disk storage or expands compressed image data to make the data visible through the printer 35. The multivalued circular shifted memory 49 is connected to the image data interface 48 and is used to output image data by circular shifting by 90 degree or −90 degree when outputting image data from the printer 35.

The system section 23 comprises the system CPU 61, the main memory 61a, the general purpose ISA bus 74, an ISA bus controller 63, the DMA controller 62, an HDD 65, and an HD-FDD interface 64, an optical disk unit 68, an SCSI interface 67, the local area network circuit controller (LAN) 71, a printer controller 70, the G4/G3·FAX controller 69 and an image bus 75.

The system CPU 61 controls the devices in the system section 23 through the system bus 73. The main memory 61a is used by the system CPU 61. The ISA bus controller 63 mediates between the ISA bus 74 and the system bus 73. The DMA controller 62 controls the data transfer through the ISA bus 74. The HDD 65 is connected to the ISA bus 74 and electronically stores image data. The HD·FDD interface 64 is used as the interface of the HDD 65. The optical disk unit 68 is connected to the ISA bus 74 and stores image data electronically. The SCSI interface 67 is used as the interface of the optical disk unit 68. The local area network circuit controller 71 is used for achieving the LAN function. The printer controller 70 is used to achieve the printer function. The G4/G3·FAX controller 69 has the G4/G3·FAX control function. The image bus 75 is used to output image data from the printer controller 70 to the page memory section 22 through the system image interface 77.

In a hard disk HD built in the HDD 65, compressed image data for every one document comprising from one to plural pages is stored as files in the state controlled by retrieval data for retrieving these documents.

Further, a control panel 24 comprising a keyboard and a display unit for providing instructions to the system section 23 is connected to the system bus 73.

The optical disk unit 68 is connected to the ISA bus 74 via the SCSI interface 67. The system CPU 61 controls the optical disk unit 68 using an SCSI command through the system bus 73, ISA bus controller 63 and ISA bus 74.

Next, the image data interface 48 will now be explained. The image data interface 48 transfers image data between the scanner 33 or the printer 35 and the page memory 47 through the image processor 34 by devices on the image bus 47 and also, transfers image data between the printer controller 70, etc. connected to the image bus 75 in the system section 23 and the page memory 46.

Figure 4:
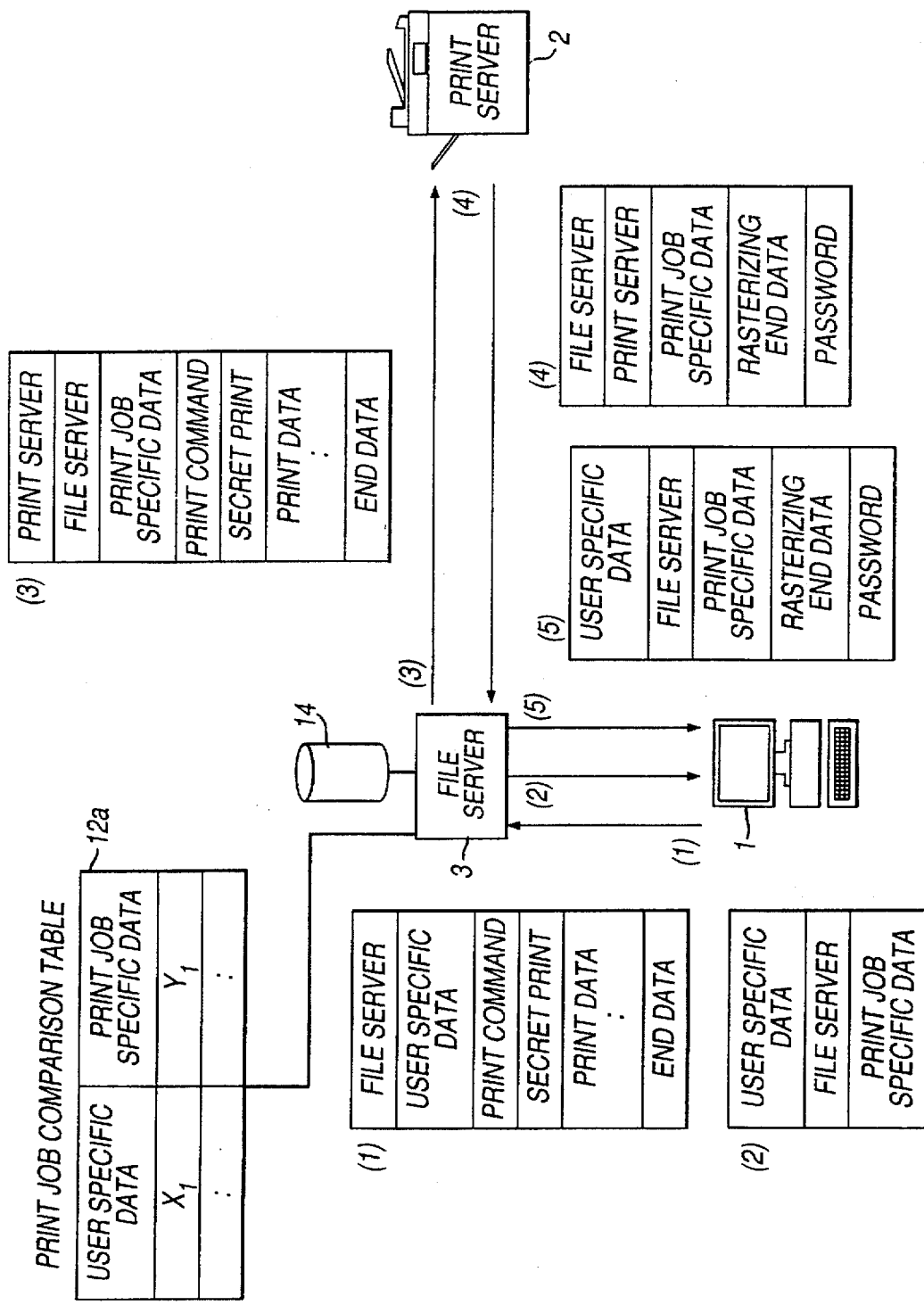
FIG. 4 is an outline diagram for explaining the contents of data and the transmission procedure when performing the printing of print data having secrecy.

Next, the data contents and transmission procedure when performing the print of secret print data will be explained referring to FIGS. 1 and 4.

First, the print command data (1) is sent to the file server 3 from the terminal 1 connected to the network 4. This print command data (1) is composed of the designation of the file server, a destination, User specific data as a sender, print command, data designating the secret print, and print data comprising code data representing a character code, character size, print format, etc. and end data. The print command data (1) from the terminal 1 is stored as the print queue in the HDD 14 in the file server 3. When the secret print is designated, the CPU 11 in the file server 3 issues Print Job specific data to enable a user to discriminate print data when the print command data (1) is received and retains a print job correspondence table 12a storing Print Job Numbers corresponding to User Numbers in the main memory 12.

The CPU 11 of the file server 3 sends the answer data (2) to the print command data (1) to the terminal 1 through the network 4. The answer data (2) is composed of User specific data as a destination, the file server designation as a sender and Print Job specific data corresponding to the User specific data. The answer data (2) from the file server 3 is supplied to the controller in the terminal 1 and Print Job specific data corresponding to User specific data is displayed on the display unit.

Figure 10:
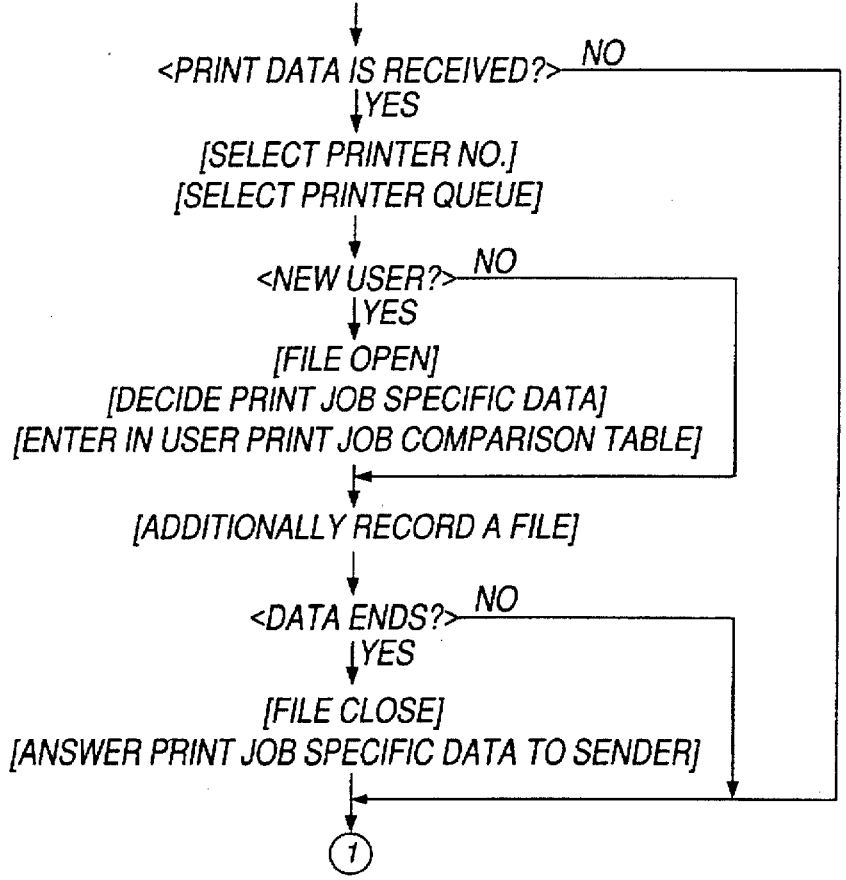
FIGS. 10 and 11 are flowcharts for explaining the process of secret printing in the file server.
Figure 11:
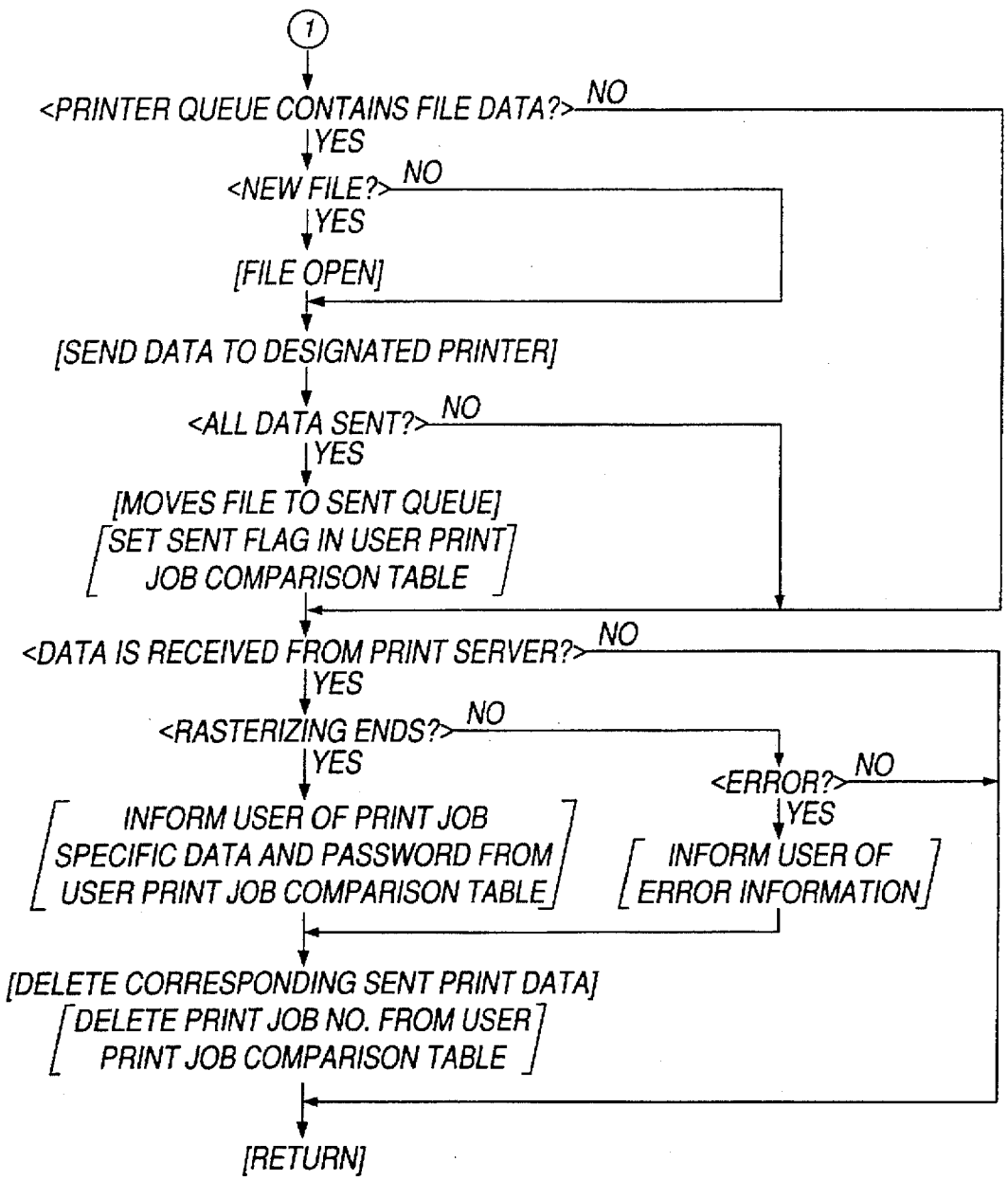

Further, the print queue of the HDD 14 in the file server 3 is monitored periodically as to whether data is supplied by the print server program shown in FIGS. 10 and 11 in the file server 3 and contents, if any, are read and sent to the print server (2) as a print command data (3) through the network 4. The print command data (3) is composed of the designation of the print server as a destination, the designation of the file server as a sender, Print Job specific data, a print command, data designating the secret print, print data and end data.

The print server 2 receives the print command data (3) for every job and rasterizes images on the page memory 46 when required. The code data contained in the print command data (3) as print data is converted into bitmap data corresponding to print image by a printer controller 70 according to the resolution of that printer. This operation is called the image rasterizing. If the print data is for the secret printing, the print server 2 itself issues a password corresponding to each job after the image rasterizing ends in a group of print jobs comprising one to several pages. An answer data (4) showing this password, the end of the image rasterizing and Job specific data are sent to the file server 3 via the network 4. The answer data (4) is composed of the designation of the file server as a destination, the designation of the print server as a sender, Print Job specific data, the data showing the rasterizing end and a password.

The CPU 11 of the file server 3 discriminates User specific data as a job requesting user corresponding to Print Job specific data contained in the answer data (4) using the print job comparison table 12a and sends an answer data (5) to the discriminated user, that is, to the terminal 1 via the network 4. The answer data (5) is composed of User specific data as a destination, the file server as a sender, Print Job specific data, the rasterizing end data and a password.

The answer data (5) is supplied to the controller in the terminal 1 and Print Job specific data corresponding to User specific data and a password are displayed on the display unit.

Thus, the user who sent print data receives the requested Print Job specific data and the password and is able to recognize the print job, out of plural print jobs, for which the print preparation has completed and for what the password is.

Thereafter, the user checks the print server 2 to confirm that there is no other user in the vicinity and asks for the output of his own print job by inputting Print Job specific data and the password through the control panel 24. The print server 2 performs the output of the print Job corresponding to that Print Job specific data and as a result, it becomes possible to get a highly secret print output.

Figure 5:
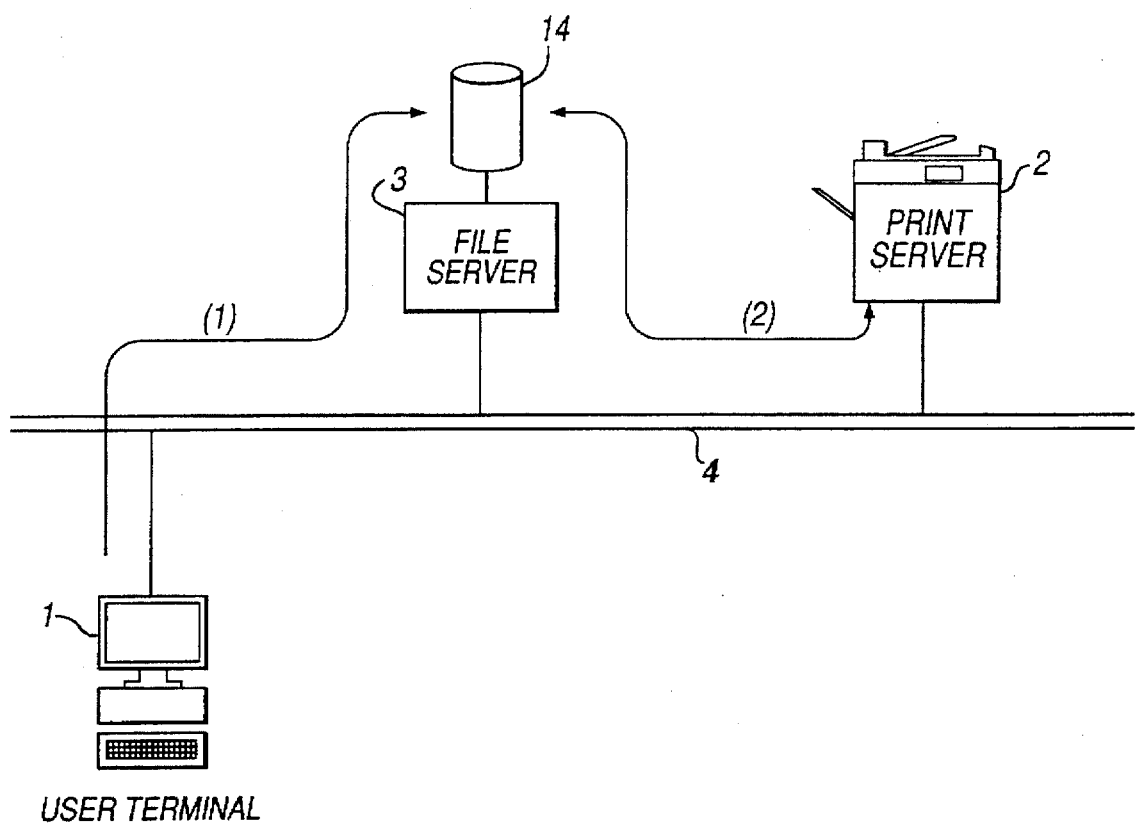
FIG. 5 is an outline diagram for explaining the contents of data and the transmission procedure when performing the ordinary printing.
Figure 6:
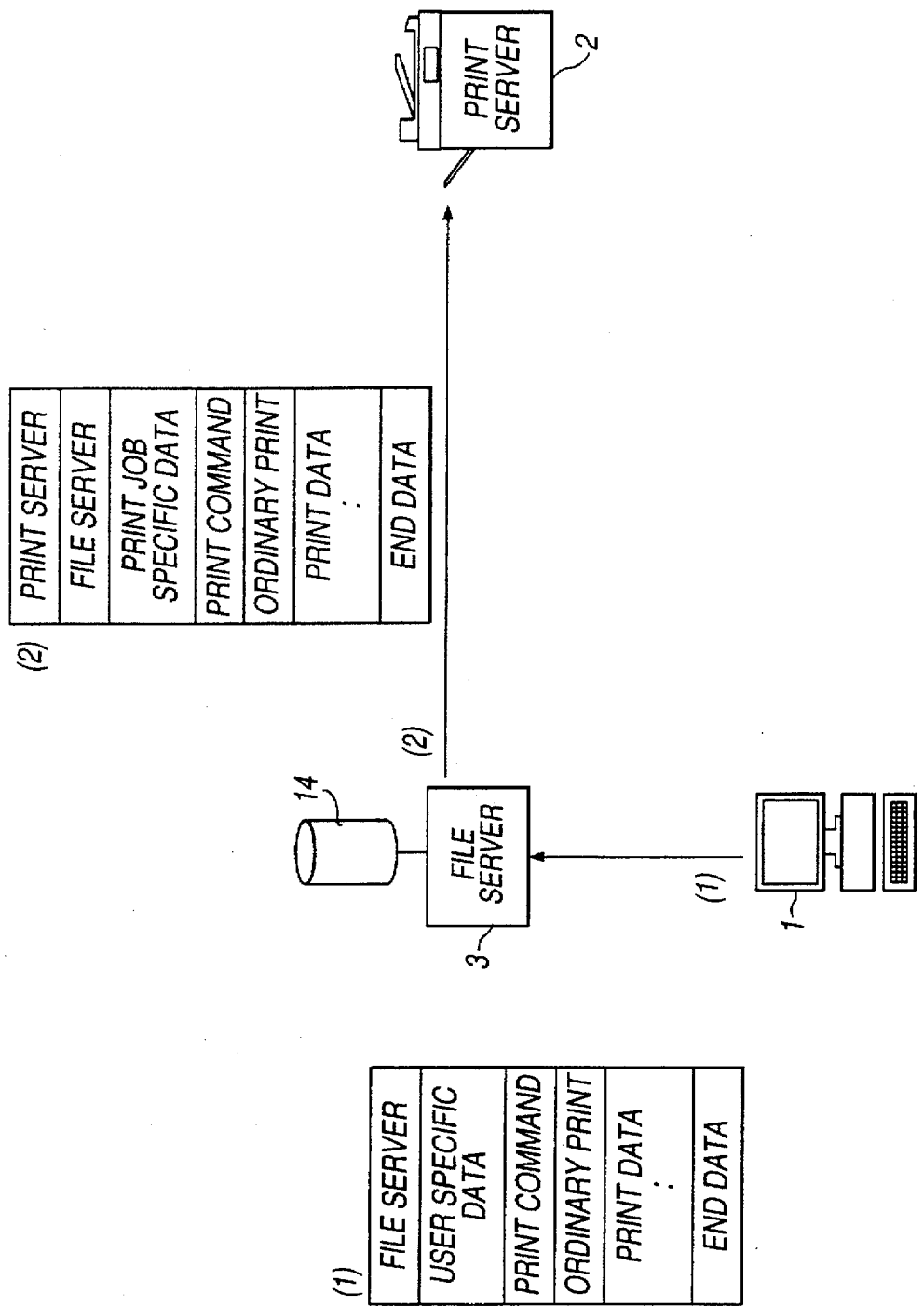
FIG. 6 is an outline diagram for explaining the contents of data and the transmission procedure when performing the ordinary printing.

Contents and transmission procedure of data in the ordinary printing of print data which is not the secret print will now be explained referring to FIGS. 5 and 6. For such a print requiring no ordinary secrecy, it is not required for user to synchronize with the print output when the user goes to get a print output and therefore, the flow of print data is sufficient in one direction only.

That is, a print command data (1) is first sent from the terminal 1 connected to the network 4. The print command data (1) is composed of the designation of the file server as a destination, User specific data as a sender, a print command, a print data comprising code data representing ordinary print designation data, a character code, a character size and print format, etc., and end data. The print command data (1) from the terminal 1 is stored in the HDD 14 in the file server 3 for each print job as a print queue in the same way as in the secret print.

As a result, it is not necessary in the file server 3 to create a comparison table of users with Job Numbers as described above because the print command data (1) is not for a secret type print.

Further, the print queue of the HDD 14 in the file server 3 is monitored as to whether data is input periodically from the print server 2 and contents of the data, if any, are read and sent to the print server 2 via the network 4 as the print command data (2). The print command data (2) is composed of the print server as a destination, the file server as a sender, Print Job specific data a print con, hand, ordinary print designation data, print data, and end data.

The print server 2 receives the print command data (2) for each job and performs the image rasterizing on the page memory 46. The code data as the print data in the print command data (2) is converted to bitmap data corresponding to the print image by the printer controller 70 according to the resolution of that printer.

As a result, the print server 2 instantly prints and outputs the print data in a unit convenient to the print when the rasterizing ends because the print data is not secret type data.

Figure 7:
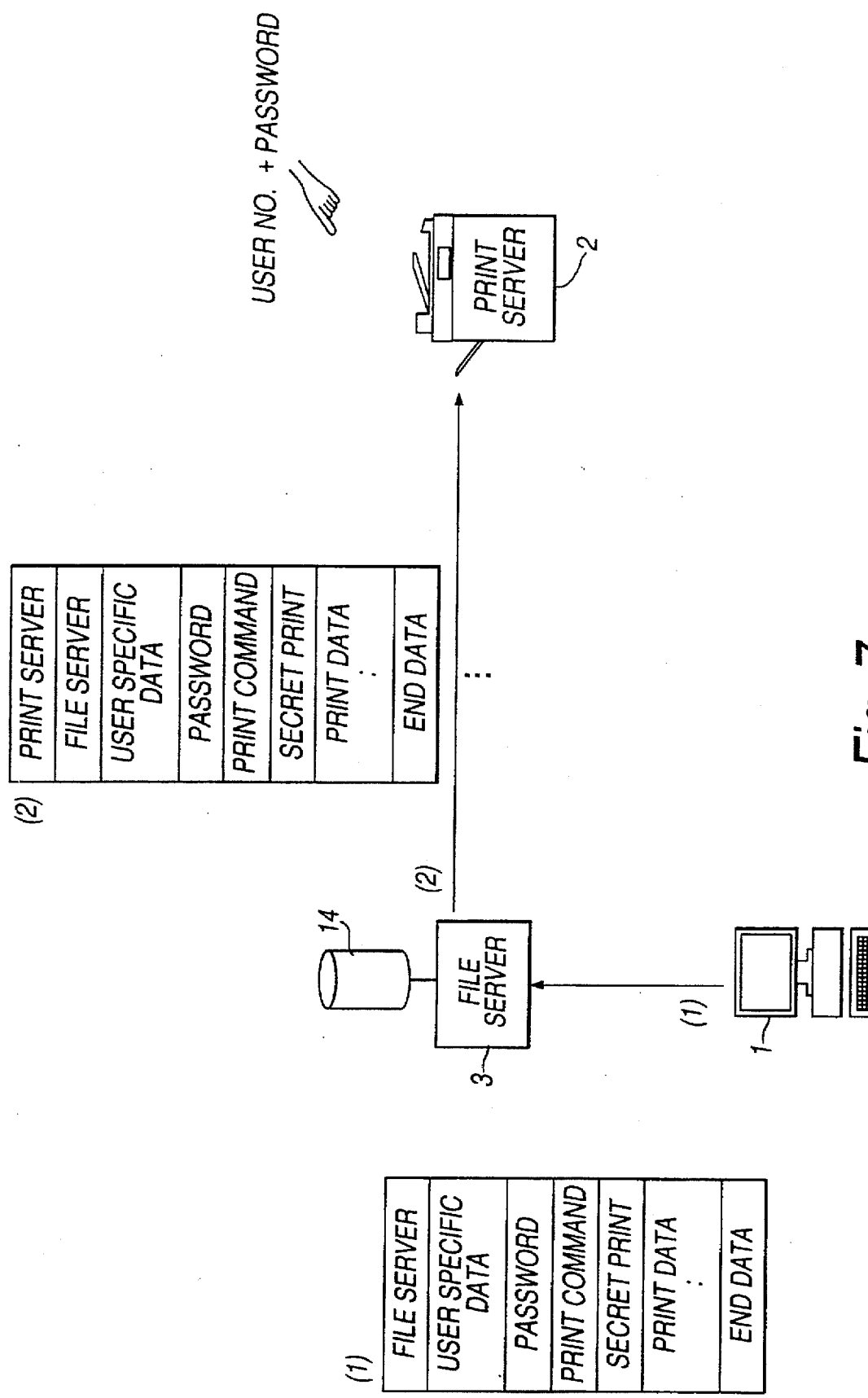
FIG. 7 is an outline diagram for explaining an embodiment of the present invention when performing the printing of print data having secrecy.

Next, an embodiment of printing secret type print data will be explained referring to FIG. 7.

In this case, a means to decide a password is simple as the user decides it in advance. The print server 2 does not issue a password as in the examples shown in FIGS. 1 and 4.

In this case, User specific data that is decided in advance before performing the network print or the electronic mail, etc. used on the network 4 is sent to the print server 2 together with print data and a password decided by user (the print command data (1) and (2)) and when obtaining the print output, the print output is performed for the user by inputting User specific data and the password through the control panel 24.

This method reduces the data transmission on the network 4. However, a user has no means to confirm when the image rasterizing has ended and it is therefore necessary to go to get the print output at a proper time.

Next, the operation of the file server 3 when performing the print according to secret print data will be explained referring to FIGS. 8 through 11.

Figure 8:
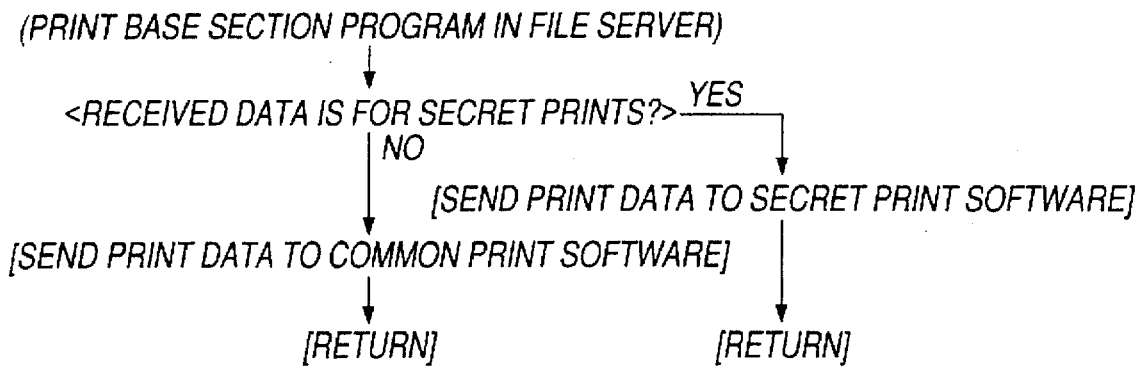
FIG. 8 is a flowchart for explaining the process of the print base section in the file server.

First, the process of the print base section software is explained referring to the flowchart shown in FIG. 8.

That is, it is judged whether the received data is for the secret print and if it is so, the print data is sent to the secret printing software and the process ends. If it is not a secret print but an ordinary print, the print data is sent to the common printing software and the process ends.

Figure 9:
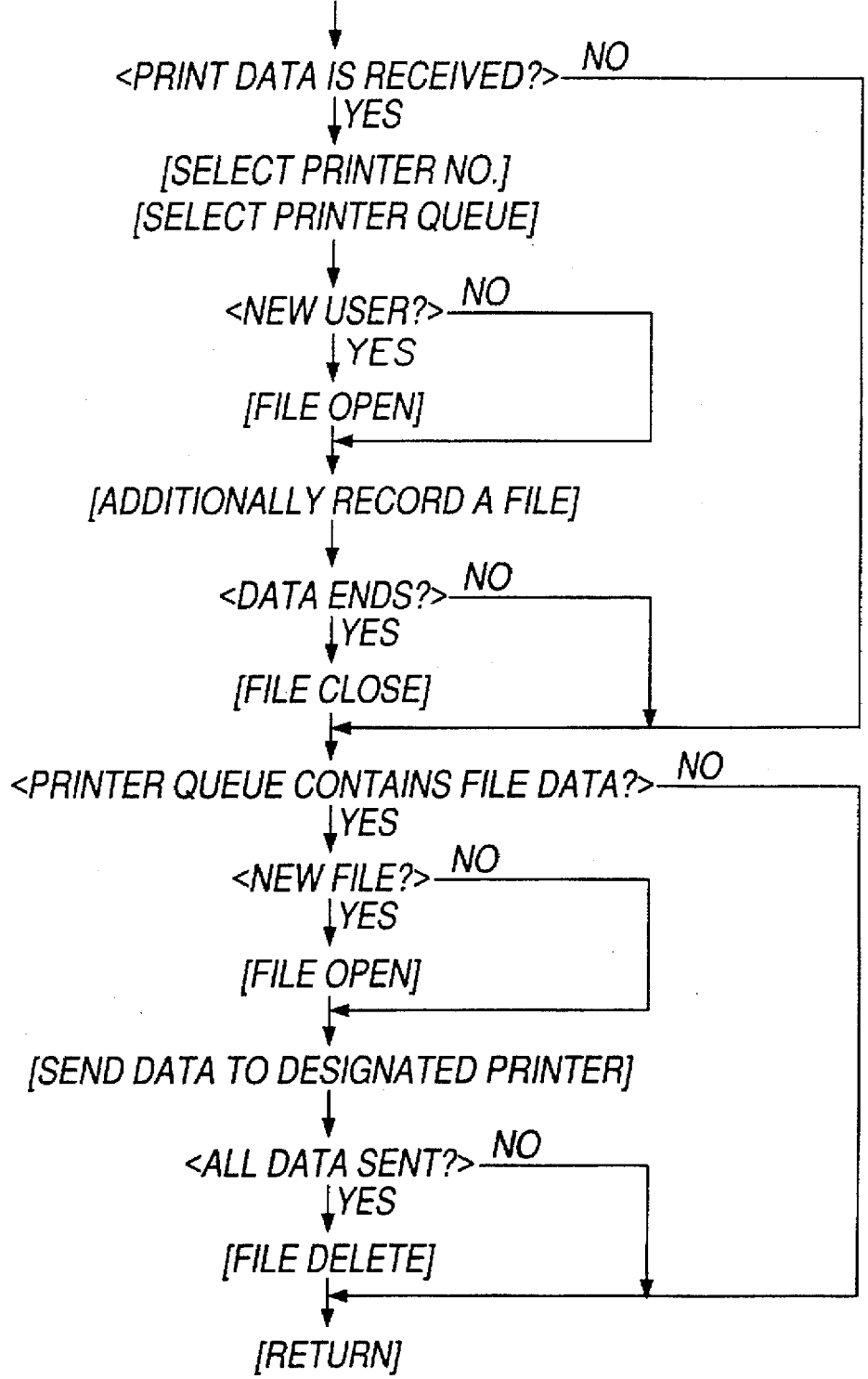
FIG. 9 is a flowchart for explaining the process of the common usable printer in the file server.

Next, the process of the common print server program will be explained referring to the flowchart shown in FIG. 9.

That is, it is judged whether print data was received and when the receipt of the print data has been confirmed, Printer No. and the printer queue are selected.

Then, whether a user is a new user is checked and if a new user, opening the file, a file is additionally recorded. If not a new user, that file is directly additionally recorded.

Then, it is checked whether data receipt was completed and if completed, the file is closed.

After closing the file or if the data was not completed or if the print data was not received, the printer queue is checked whether file data is contained. The result of this check revealed that there is file data, it is checked whether the file is a new file and if a new file, the file is opened. After opening the file or if the file was not a new file, data is sent to a designated printer.

Then, it is checked whether all data were sent and if all data were sent, the file is deleted. After deleting the file or when all data were not sent or when there was no file data in the printer queue, the process is terminated.

Next, the process of the secret print server program will be explained referring to the flowcharts shown in FIGS. 10 and 11.

That is, it is judged whether print data was received and if the receipt of the print data was confirmed, Printer No. and a printer queue are selected. Then, it is checked whether a user is a new user and if a new user, a file is opened, Print Job specific data is decided and entered in the user print job comparison table. Thereafter or when a user is not a new user, a file is additionally recorded.

Then, it is checked whether data ended and if ended, the file is closed and Print Job specific data is answered to a sender.

After answering this Print Job specific data or when data was not ended or when no print data was received, the printer queue is checked if it contains file data. If file data is contained in the print queue, it is checked if a file is a new file. In case of a new file, the file is opened. After opening the file or when the file is not a new file, data is sent to the designated printer.

Then, it is checked if all data were sent and if so, a file is moved to the sending completed queue and an answered flag is set in the user print job comparison table. After setting the answered flag or when all data were not sent or when no file data was contained in the printer queue, it is checked if data were received from the print server. Then, if data were received, it is checked whether the image rasterizing was completed. When the image rasterizing was completed, user is informed of Print Job specific data and a password from the user print job comparison table.

Further, after informing Print Job specific data and the password or after informing error information, corresponding sent print data are deleted and Print Job specific data is deleted from the user print job comparison table. Thereafter or when there was no error or when no data was received from the print server, the process is terminated.

Next, the operation of the print server 2 when performing the printing of secret print data will be explained referring to the flowcharts shown in FIGS. 12 through 19.

Figure 12:
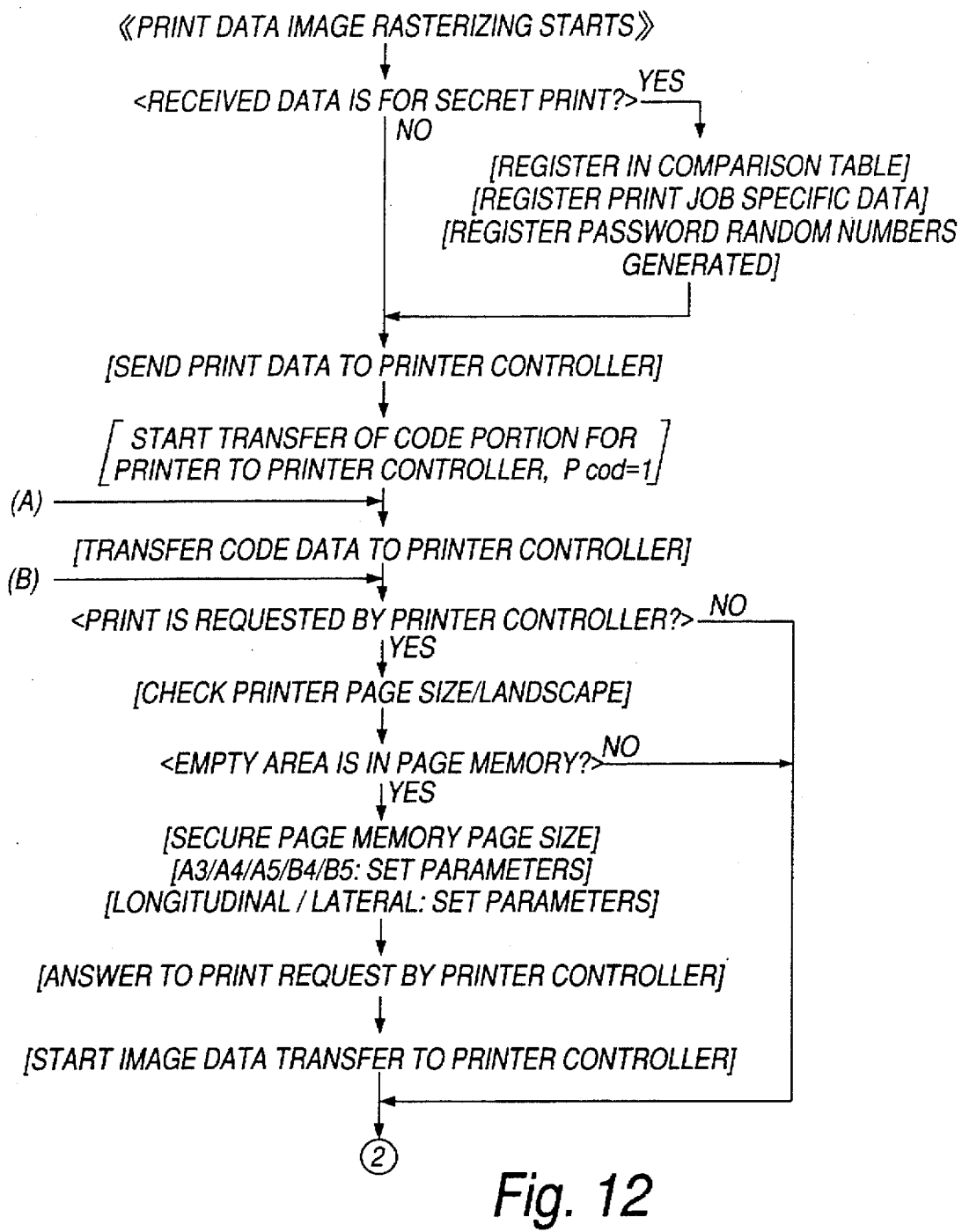
FIGS. 12, 13 and 14 are flowcharts for explaining the image rasterizing process of the received print data in the print server.
Figure 13:
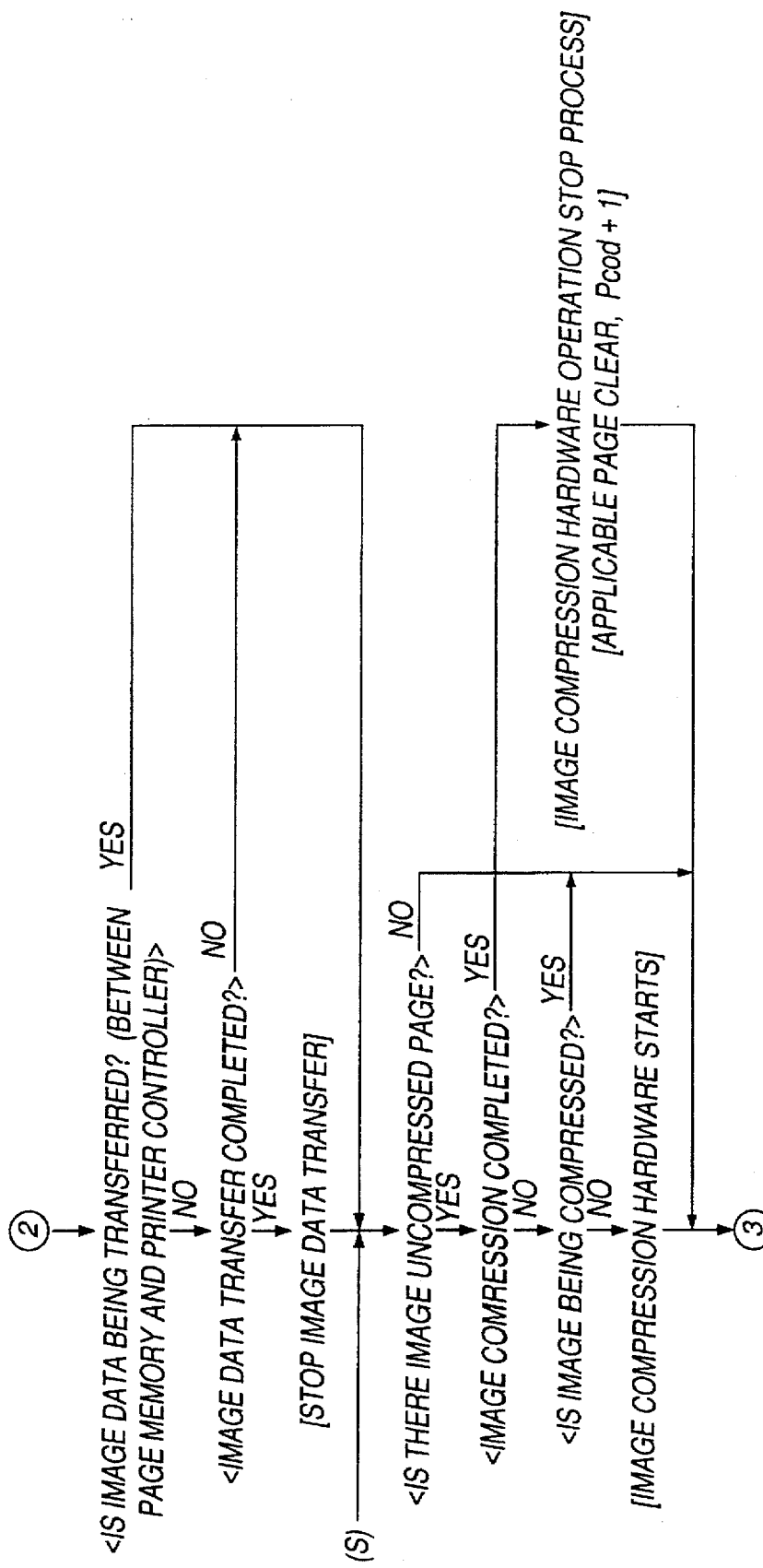
Figure 14:
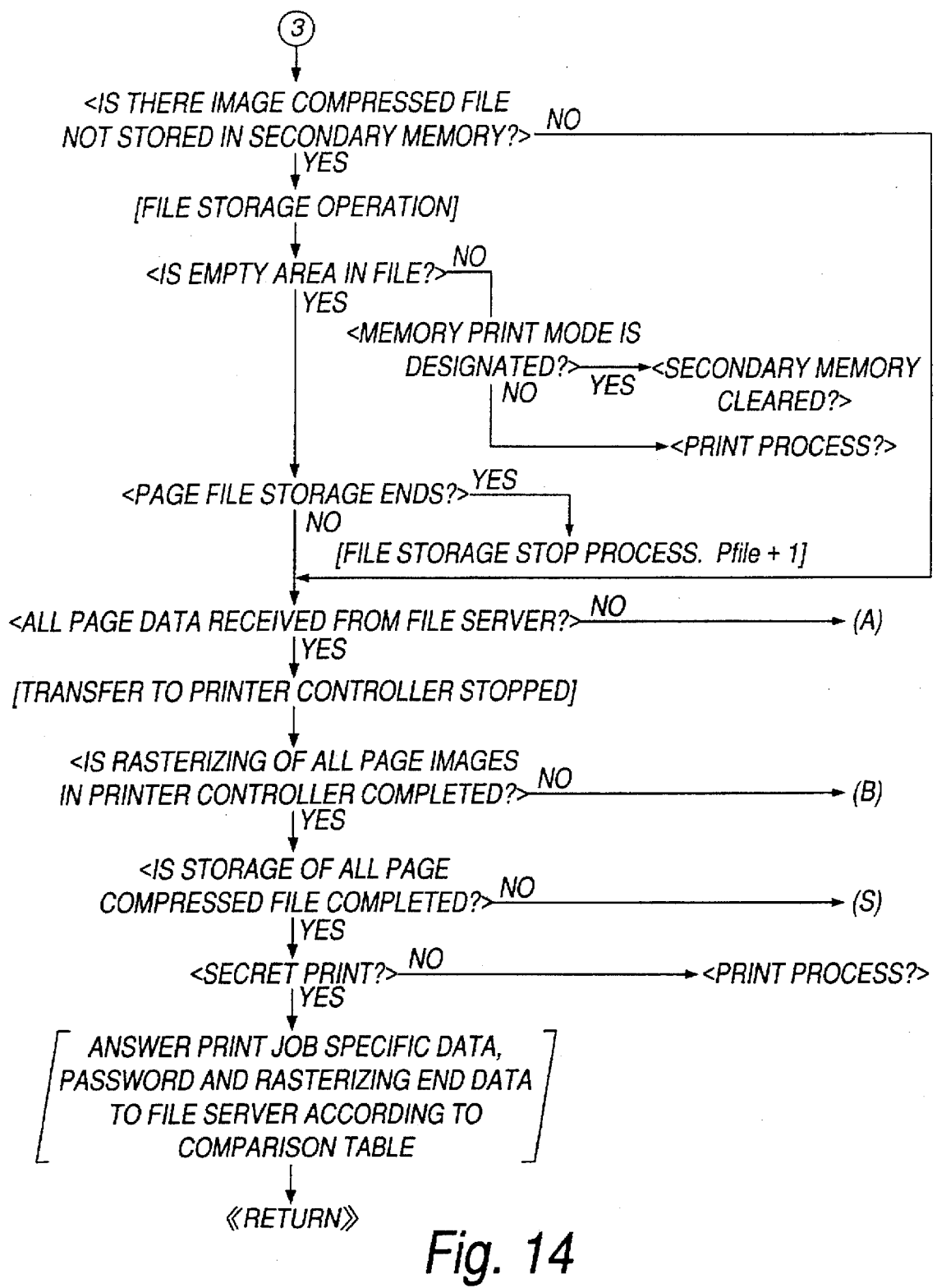

First, the image rasterizing process when print data is received will be explained referring to the flowcharts shown in FIGS. 12 though 14.

That is, it is checked whether received data are for the secret printing. When the received data are for the secret printing, the data and Print Job specific data are registered in the print job comparison table, and random numbers for a password are generated and registered in the print job comparison table.

Then, after the registration or when the received data are not for the secret printing, the print data are sent to the print controller 70, the transfer of the code portion for the printer 35 to the printer controller 70 is started and the code data are transferred to the printer controller 70. Then, when the printing is requested by the printer controller 70, the printer page size/landscape are checked and it is also checked if there is an empty area in the page memory 46. The landscape expresses the length and breadth of paper. If an empty area is available, the page numbers are updated, the page size of the page memory 46 is secured, parameters are set, the print request by the printer controller 70 is answered and the transfer of image data to the printer controller 70 is started.

Then, if there was no print request by the printer controller 70 or there was no empty area in the page memory 46 when the transfer was started, it is checked if image data are being transferred between the page memory 46 and the printer controller 70. If the transfer of the image data ends during the transfer, the image data transfer is stopped.

Then, when the image data are not being transferred or the transfer has not been completed or the transfer was stopped, it is checked if there is any image uncompressed page. If there is an image uncompressed page, the image compression was not completed or the image data are not being compressed, the image compression operation by the compression/expansion means 50 is started. When the image compression is completed, the image compression operation by the compression/expansion means 50 is stopped and the applicable page is cleared and made to "Pcod+1".

If there is no image uncompressed page or when the image data are being compressed or when the image compression operation was stopped or when the image data was compressed and there is a page storing no file in the hard disk HD as a secondary memory, the file storage operation is carried out. Then, it is checked if there is an empty area in a file. If there is an empty area in the file, it is checked if the page file storage was complete. When the page file storage was completed, the file storage process is stopped and made to "Pfile+1".

Further, if there is no empty area in a file, it is checked if the memory print mode has been designated. When the memory print mode has been designated, the clearing process of the hard disk as the secondary memory is executed and when the memory print mode was not designated, the print process begins.

When the page file storage has not been completed, it is checked if data on all pages were received from the file server. If not completed, the process returns to the transfer process of code data to the printer controller 70. If completed, the transfer of code data to the printer controller 70 is stopped.

After stopping the transfer, the printer controller 70 is checked if the image rasterizing was completed on all pages. If not, the process returns to the checking of the print request from the printer controller 70. When completed, it is checked if the compressed file storage was completed on all pages. If not completed, the process returns to the checking of the image uncompressed pages. When completed, it is checked if the print is the secret print. If not the secret print, the print process starts and when the print is the secret print, Print Job specific data extracted by referring to the user print job comparison table and a password are answered to the file server jointly with the image rasterizing completion data. After this answering, the process is terminated.

Figure 15:
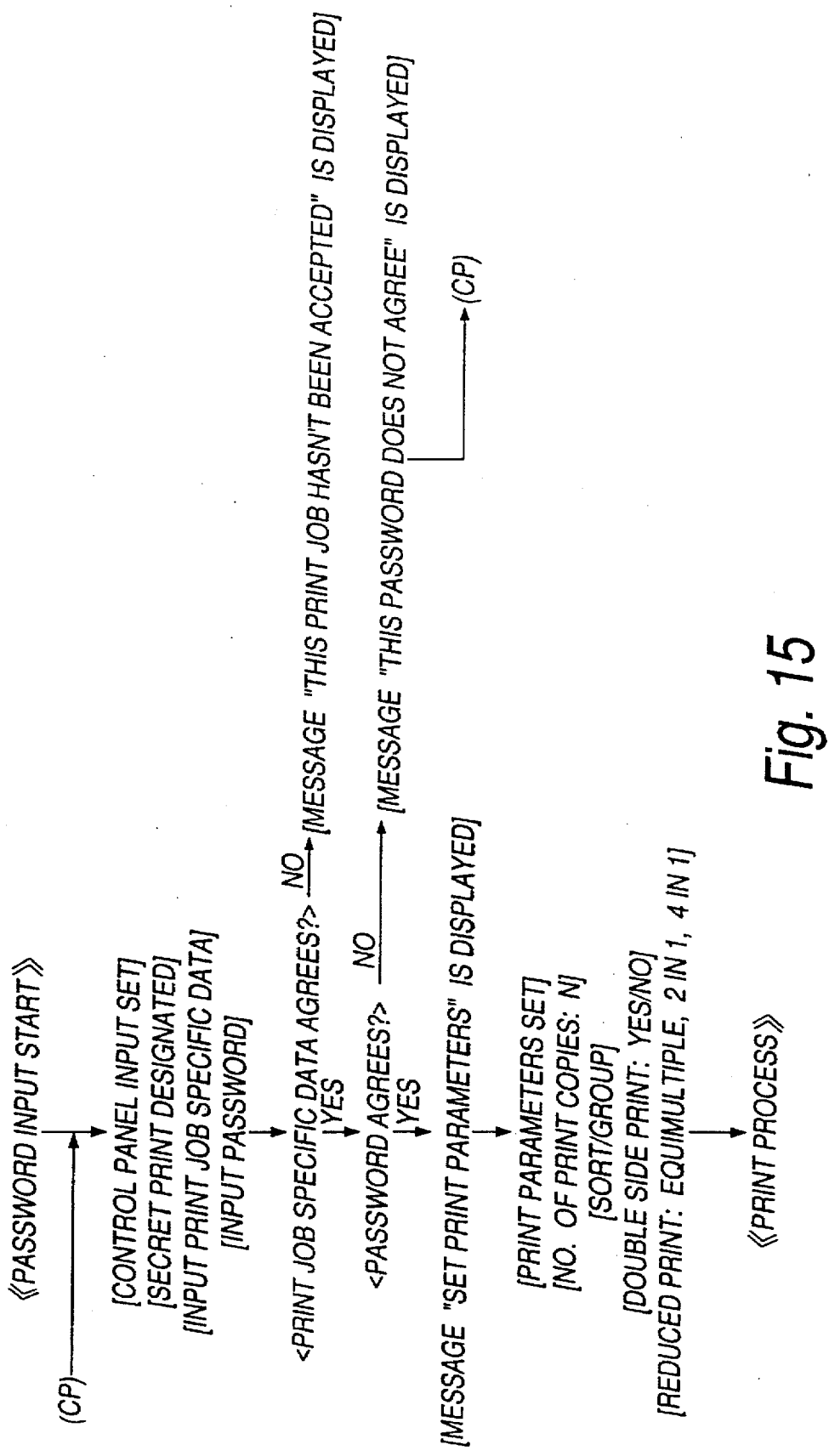
FIG. 15 is a flowchart for explaining the print starting operation in the print server.
Figure 16:
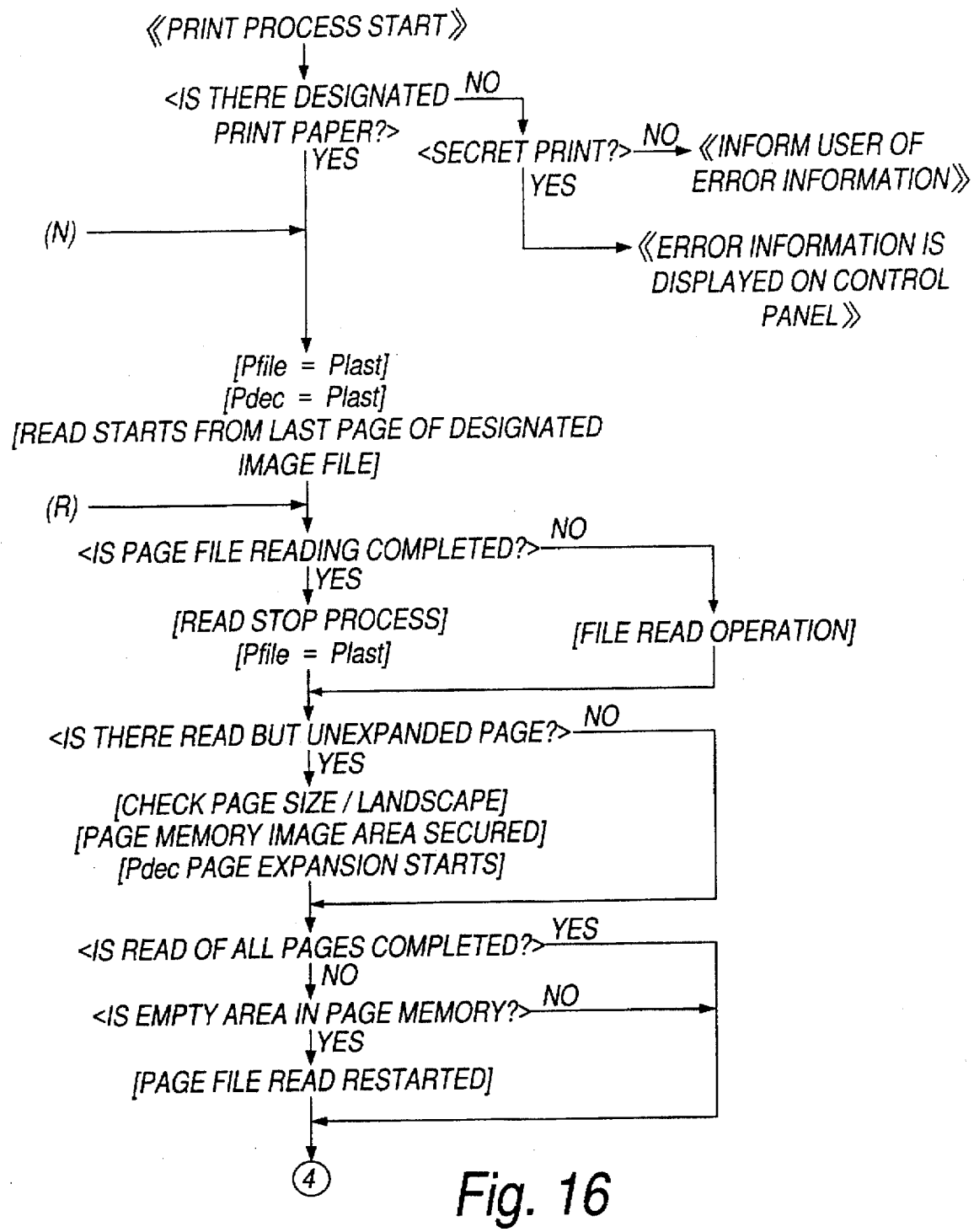
FIGS. 16 through 19 are flowcharts for explaining the print process in the print server.
Figure 17:
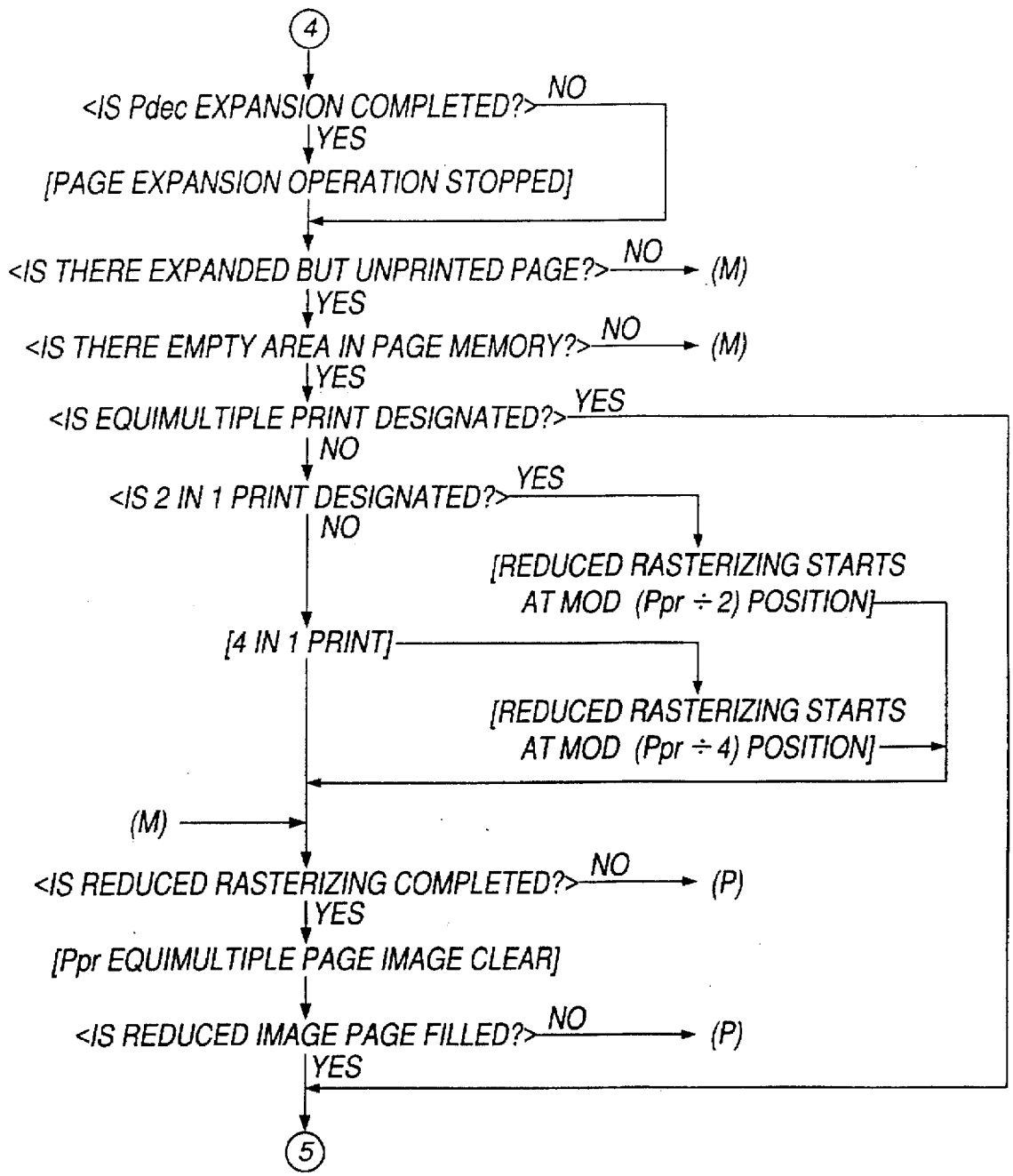
Figure 18:
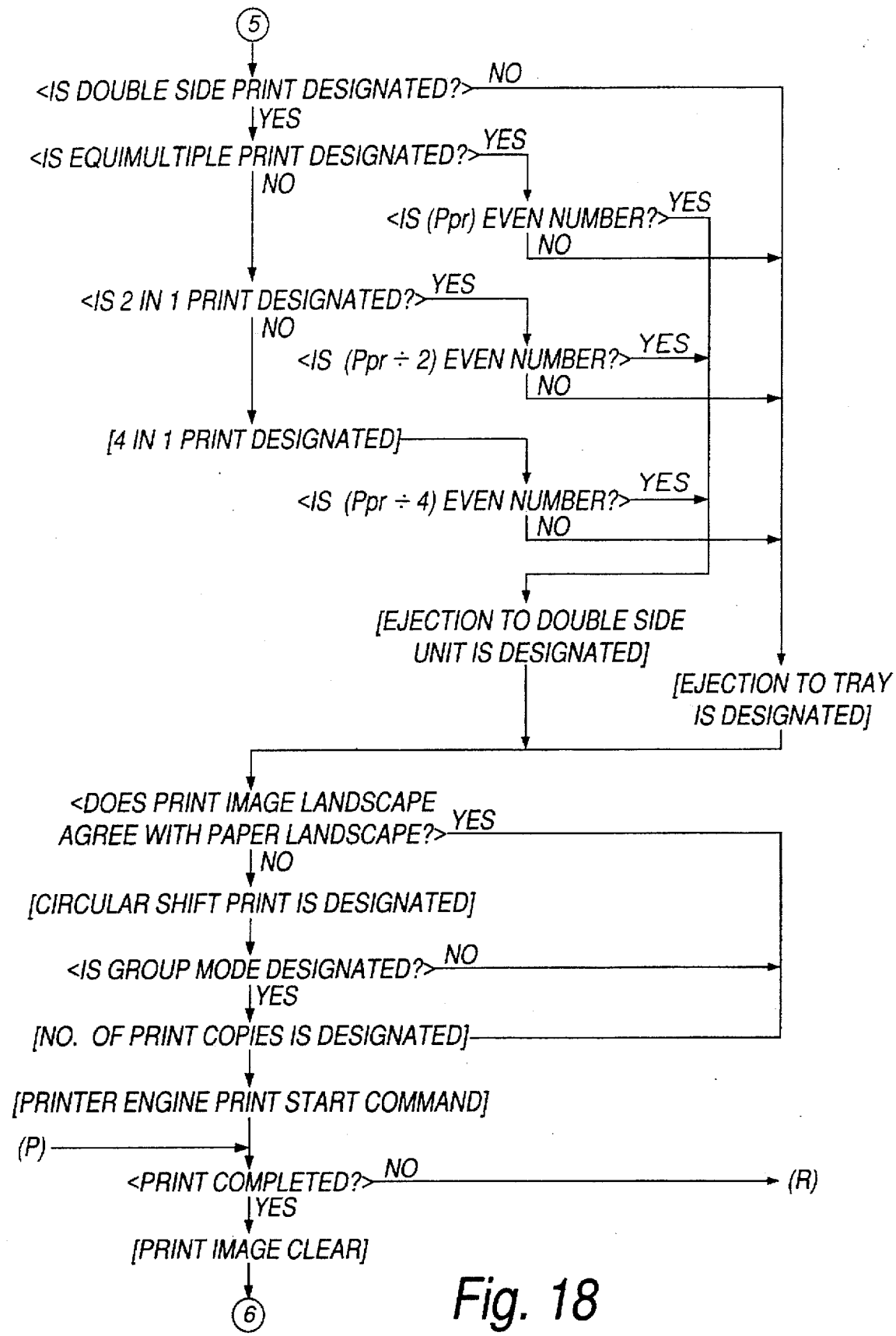
Figure 19:
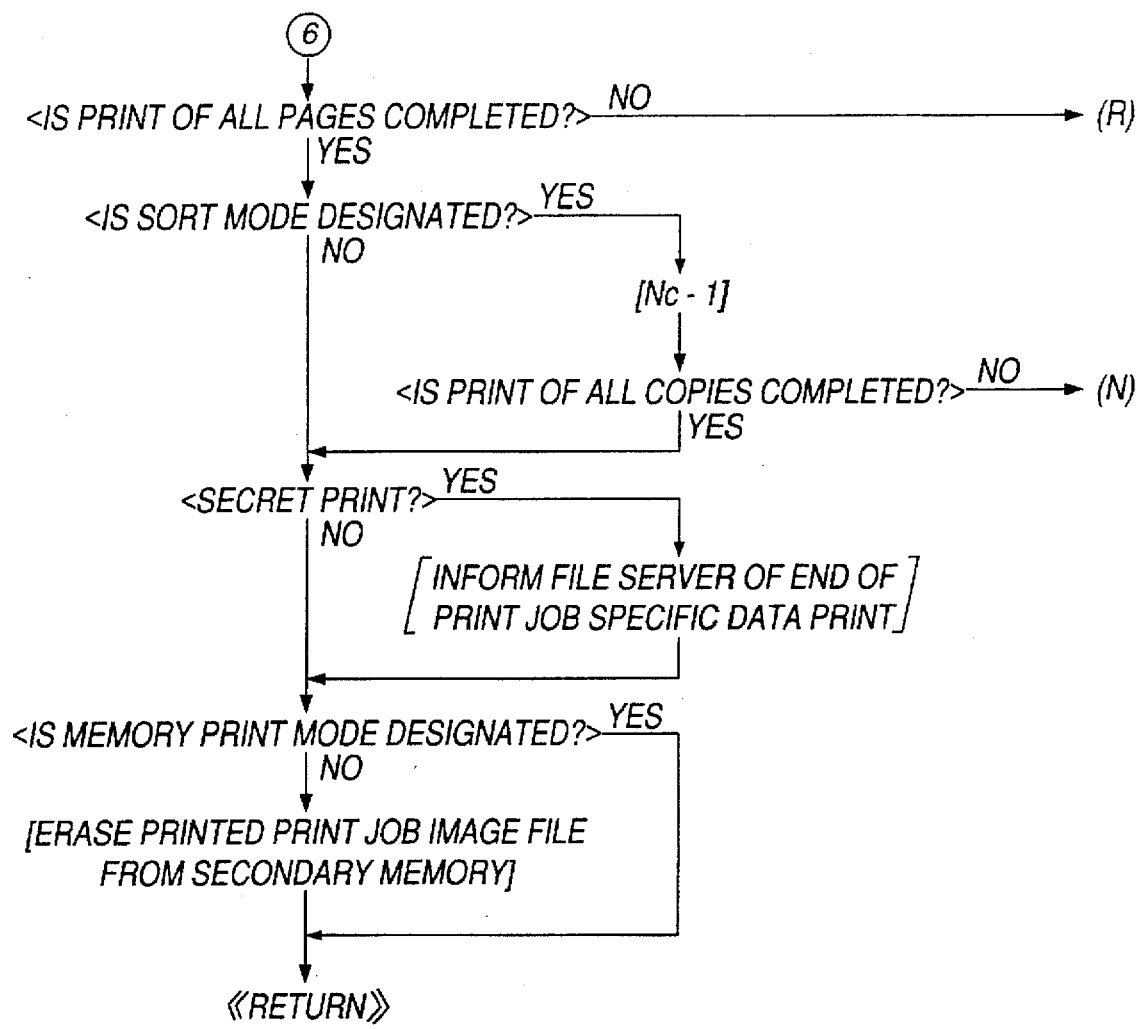

Next, the print starting operation by inputting a password for the secret printing through the control panel 24 will be explained referring to the flowchart shown in FIG. 15.

First, the input is made through the control panel 24. That is, the secret printing designation, Print Job specific data and a password are input.

After setting the data as explained above, it is checked if there is an agreed Print Job specific data. If there is no agreed Print Job specific data, a message "This print job hasn't been accepted" is displayed. If there is an agreed Print Job specific data, it is checked if there is an agreed password. If there is no agreed password, a message "This password does not agree" is displayed.

When there is an agreed password, a message "Set Print Parameters" is displayed. In response to this display, print parameters such as the number of copies to be printed: N, sort/group, double side print: yes/no, reduced print: equimultiple, 2 in 1, 4 in 1, etc. are set. After the parameter setting, the operation proceeds to the print process.

Next, the print process will be explained referring to the flowcharts shown in FIGS. 16 through 19.

First, it is checked if there is designated print paper. If there is no designated print paper, it is checked if the print is the secret print. If not the secret print, the user is informed of error information. In case of the secret print, error information is displayed on the control panel 24.

If there is the designated print paper, "Pfile=Plast" and "Pdec=Plast" are set and the reading starts from the last page of the designated image file. Then, it is checked if the reading of the page file ends. If the reading has ended, the reading is stopped and "Pfile=Pfile−1" is set. If the reading hasn't been completed, the file reading operation is continued.

After this file reading operation or the file reading stop process, it is checked if there is a read but not expanded page. If there is such a page, the page size and landscape are checked, an image area is secured in the page memory 46 and the expansion of "Pdec" page starts. After starting this expansion or there is not such a page, it is checked if the reading of all pages ended. If the reading of all page has not been ended, it is checked if there is an empty area in the page memory 46. If there is an empty area, the reading of page file is started again.

After this restart or when the reading of all pages ended or there is no empty area in the page memory 46, it is checked if the expansion of Pdec has ended. If the expansion of Pdec ended, the page expansion operation is stopped. After stopping this page expansion operation or if the expansion of Pdec has not completed, it is checked if there is an expanded but unprinted page. If there is such a page, it is checked if there is an empty area in the page memory 24. If there is no empty area in the page memory 24 or there is no expanded but unprinted page, the operation proceeds to the check of the completion of reduced rasterizing which will be explained later.

Figure 20:
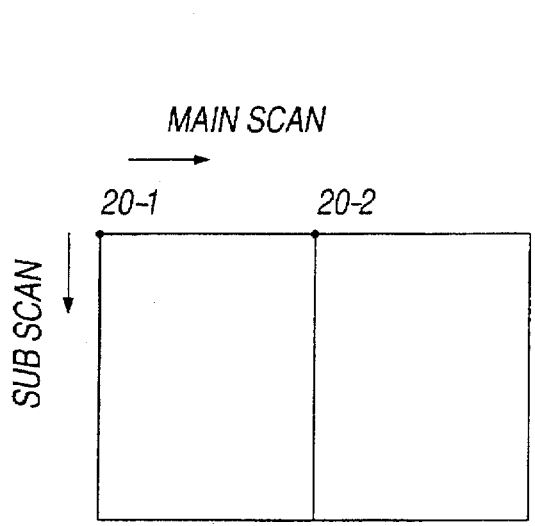
FIGS. 20 and 21 are outline diagrams for explaining the start position of the reduced rasterizing in case of the 2-in-1 print.
Figure 21:
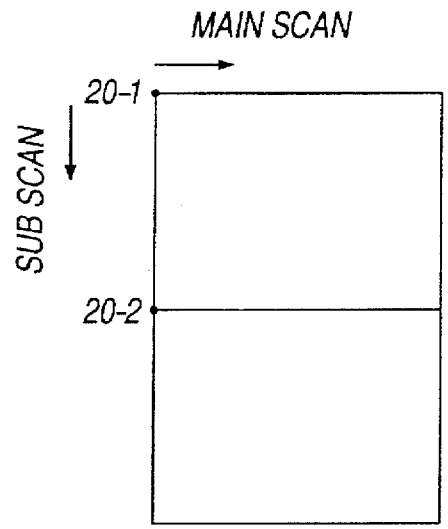

Further, when there is an empty area in the page memory 24, it is checked if the equimultiple print has been designated. If the equimultiple print hasn't been designated, it is checked if the 2 in 1 print has been designated. If the 2 in 1 has been designated, the reduced rasterizing starts from the "MOD (Ppr÷2)" position. "MOD" represents the residual. If the residual is 1, the reduced rasterizing starts from the position of 20-1 as shown in FIG. 20 in case of longitudinally long print data and from the position of 21-1 in case of laterally long print data. If the residual is 0, the reduced rasterizing starts from the position of 20-2 in case of longitudinally long print data and from the position of 21-2 in case of laterally long print data.

Figure 22:
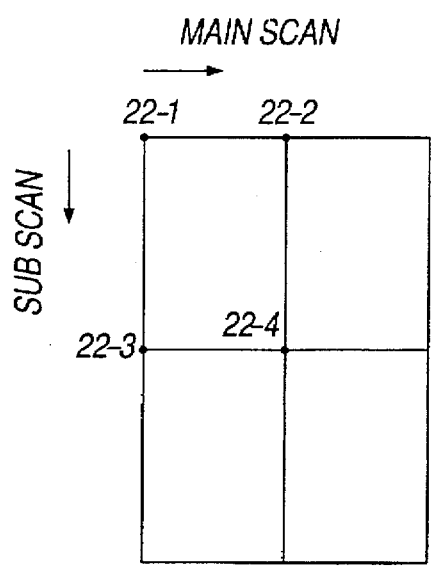
FIGS. 22 and 23 are outline diagrams for explaining the start position of the reduced rasterizing in case of the 4-in-1 print.
Figure 23:
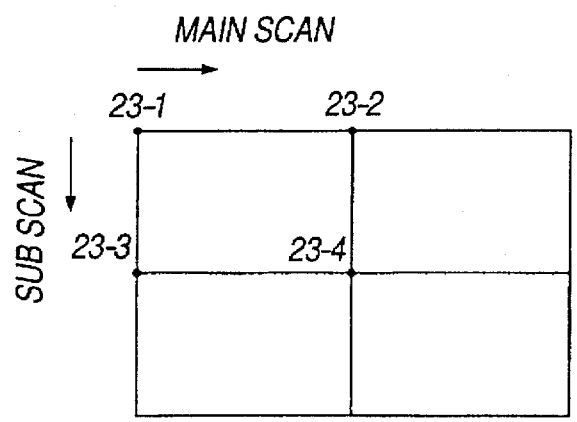

If the 2 in 1 print is not designated, it is checked if the 4 in 1 print has been designated. In case of the 4 in 1 print designation, the reduced rasterizing starts from the position of "MOD (Ppr÷4)". "MOD" represents the residual. If the residual is 1, the reduced rasterizing starts from the position of 22-1 shown in FIG. 22 in case of longitudinally long print data while the reduced rasterizing starts from the position of 23-1 shown in FIG. 23 in case of laterally long print data. If the residual is 2, the reduced rasterizing starts from the position of 22-2 shown in FIG. 22 in case of longitudinally long print data and from the position of 23-2 shown in FIG. 23 in case of laterally long print data. If the residual is 3, the reduced rasterizing starts from the position of 22-3 shown in FIG. 22 in case of longitudinally long print data and from the position of 23-3 shown in FIG. 23 in case of laterally long print data. If the residual is 0, the reduced rasterizing starts from the position of 22-4 shown in FIG. 22 in case of longitudinally long print data and from the position of 23-4 shown in FIG. 23 in case of laterally long print data.

Then, after the reduced rasterizing of the 2 in 1 or 4 in 1 print was executed or when there is no expanded but unprinted page, it is checked if the 2 in 1 or 4 in 1 print reduced rasterizing was completed.

When the reduced rasterizing was completed, the Ppr equimultiple page image is cleared and it is checked if the reduced image page has been filled. If the reduced rasterizing hasn't been completed or when the reduced image page has not been filled, the operation proceeds to the print end check process.

When the reduced image page is full, it is checked if the double side print has been designated. If the equimultiple print has been designated, "Ppr" is checked if it is an even number. When the equimultiple print is not designated, it is checked if the 2 in 1 print has been designated. When the 2 in 1 print has been designated, "Ppr+2" is checked if it is an even number. When the 2 in 1 print has not been designated, it is judged that the 4 in 1 print has been designated and "Ppr+4" is checked if it is an even number.

When the double side printing hasn't been designated, "Ppr" is not an even number, "Ppr+2" is not an even number and "Ppr+4" is not an even number, the ejection to the tray is designated. When each of "Ppr", "Ppr+2" and "Ppr+4" is an even number, the ejection to the double side unit is designated.

Then, it is checked if the print image landscape agrees with the paper landscape. If they do not agree with each other, the circular shift print is designated and it is checked if the group mode has been designated. When the group mode has been designated, the number of printing copies is designated. After designating the number of printing copies or when the print image landscape agrees with the paper landscape or when the group mode hasn't been designated, the print start command is output to the printer engine.

Then, it is checked if the print has been completed. If not completed, the operation returns to the process to check if the page file reading has completed. When judged that the print has completed, the print image is cleared and it is checked if the print of all pages has completed. If the print of all pages hasn't completed, the operation returns to the process to check if the page file reading has completed and if the print of all pages has completed, it is checked if the sort mode has been designated.

When the sort mode has been designated, "Nc−1" is executed and it is checked if the print of all copies has completed. When the print of all copies hasn't completed, the operation returns to the process when there is designated print paper.

When the sort mode hasn't been designated or the print of all copies has completed, the print is checked if it is the secret print. In case of the secret print, the file server 3 is informed of the completion of printing of Print Job specific data. After informing this print completion or when the print is not the secret print, it is checked if the memory print mode has been designated. When the memory print mode hasn't been designated, it is erased from the secondary memory which is a printed print job image file. After this erasion or when the memory print mode has been designated, the operation is terminated.

Figure 24:
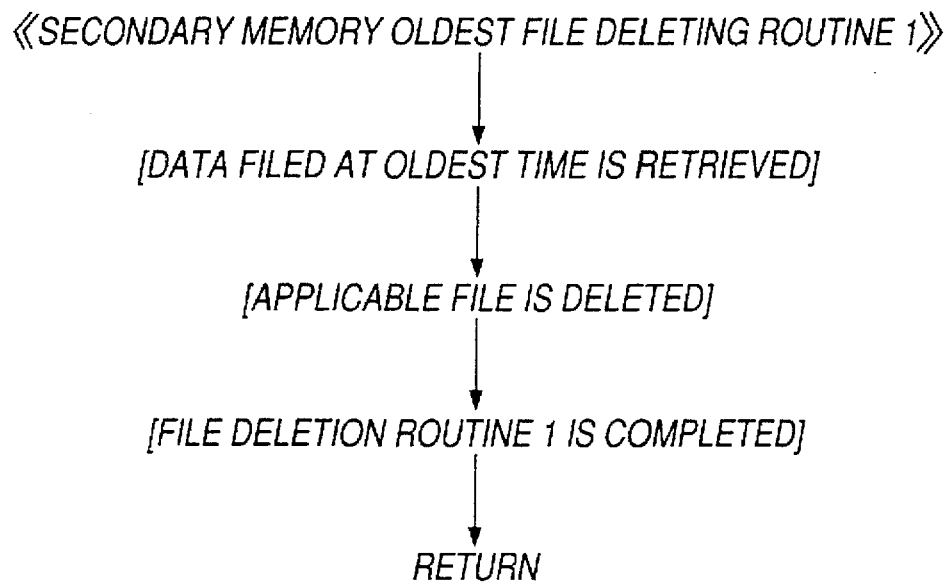
FIGS. 24 and 25 are flowcharts for explaining the oldest file deletion routine.

Next, the oldest file deleting routine 1 of the hard disk HD, a secondary memory, will be explained referring to the flowchart shown in FIG. 24.

The oldest file is deleted from the hard disk HD when the empty area of the hard disk HD is reduced.

That is, data filed at the oldest time is retrieved and the applicable file is deleted from the hard disk HD.

Figure 25:
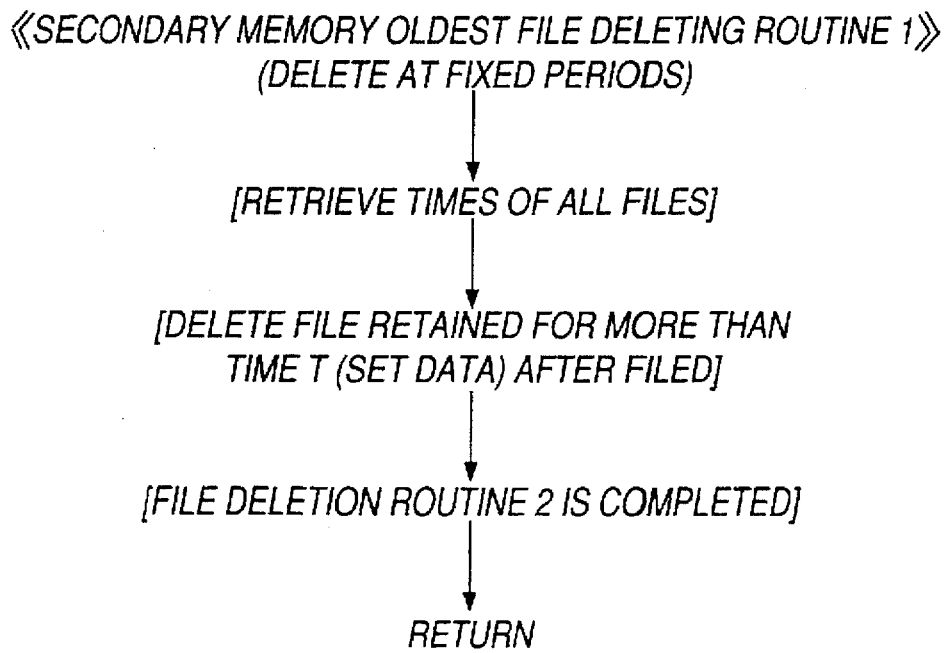

Further, the oldest file deleting routine 2 (the periodical deletion) of the hard disk HD, a secondary memory, will be explained referring to the flowchart shown in FIG. 25.

That is, times of all files are retrieved and files stored for more than time T (a set time) are deleted from the hard disk HD.

Next, another embodiment of the present invention when performing the print of print data with secrecy will be explained referring to FIG. 26.

In the embodiment explained above referring to FIGS. 1 and 4, a user inputs Print Job specific data and a password through the control panel 24 of the print server 2 to get the print output. On the other hand, in another embodiment shown in FIG. 26, a time and labor to input Print Job specific data through the control panel 24 was saved. To save the time and labor for inputting Print Job specific data, the print server 2 outputs a retrieval sheet KS as shown in FIG. 27 to a user who directed the secret print. As shown in FIG. 27, a user name UN and Print Job specific data JN have been printed on this retrieval sheet KS. User scans the retrieval sheet KS by using the scanner 33 to read the User name UN and Print Job specific data JN and inputs a password through the control panel 24 of the print server 2. The print server 2 provides the print output corresponding to Print Job specific data JN read by the scanner 33 and as a result, a user is able to get the highly secret print output.

Figure 26:
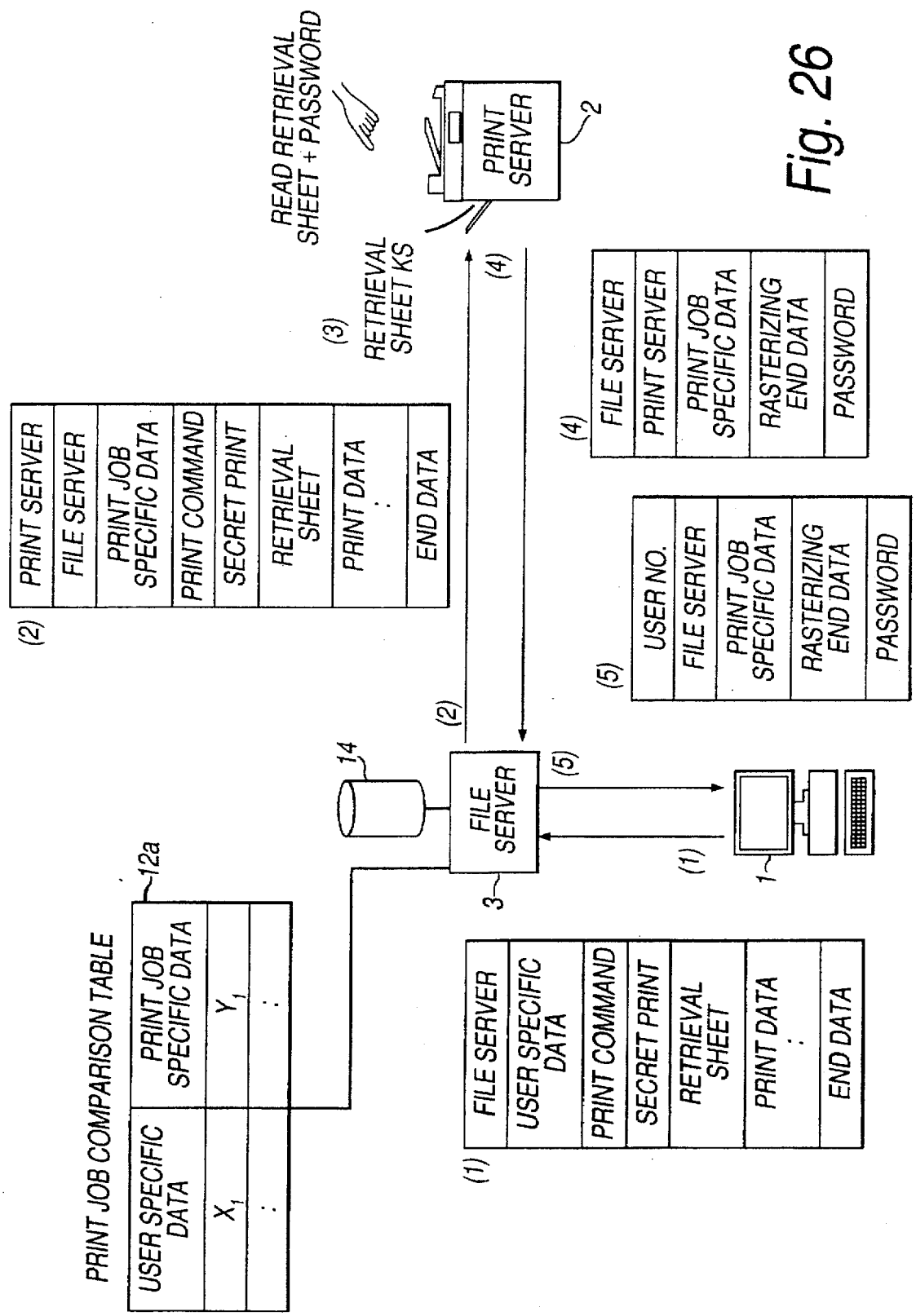
FIG. 26 is an outline diagram for explaining another embodiment of the present invention when performing the printing of secret print data.
Figure 27:
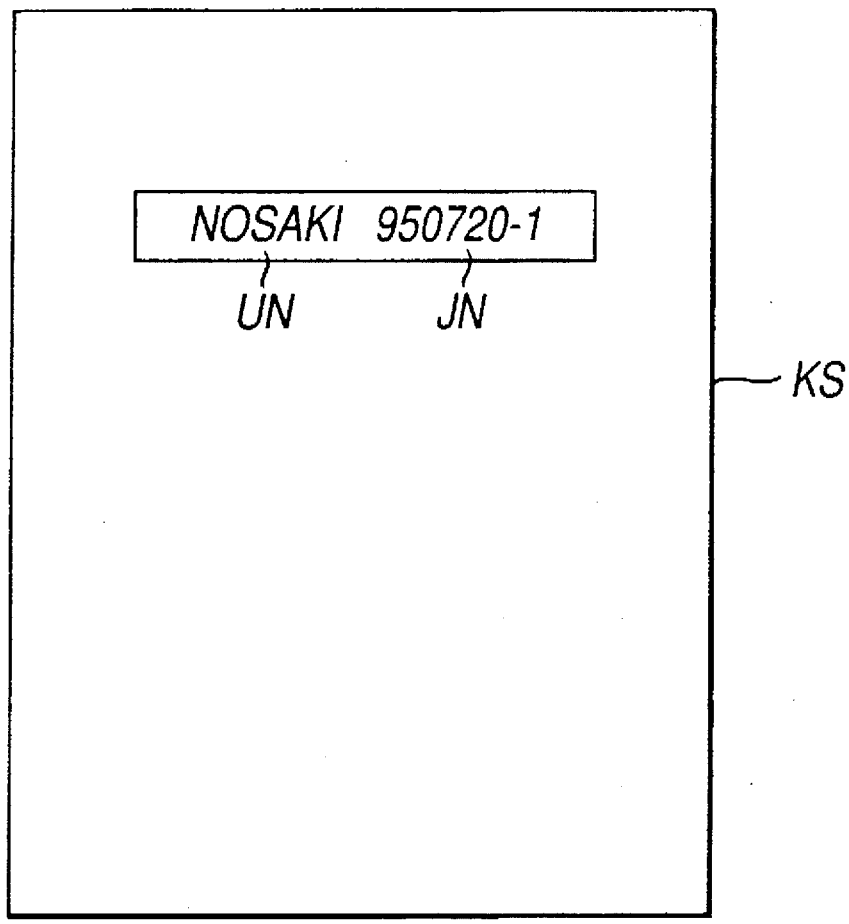
FIG. 27 is a plan view showing s retrieval sheet that is used in the other embodiment shown in FIG. 26.

That is, as shown in FIG. 26, the print command data (1) is first sent to the file server 3 from the terminal 1 connected to the network. This print command data (1) is composed of the designation of the file server as a destination, User specific data as a sender, the print command, the data designating the secret print, the data designating the provision of the retrieval sheet, the print data comprising the code data representing a character code, a character size, print format, etc. and the end data. The print command data 1 from the terminal (1) is stored in the HDD 14 in the file server 3 as a print queue. When the secret print has been designated, the CPU 11 of the file server 3 issues Print Job specific data to user for enabling the user to discriminate each print data when the print command data (1) is received, and retains the print job comparison table 12a storing Print Job specific data corresponding to User specific data.

Further, retrieval sheet data are made from the User specific data and the Print Job specific data. That is, the retrieval sheet data comprises first data showing a User name obtained by converting the User specific data and second data showing Print Job specific data. The first and second data are added to the print data as a top page data.

A user name comparison table (not shown) is retained in the file server 3. That is, the user name corresponding to User specific data contained in the print command data (1) has been registered in advance and the file server 3 retains the user name comparison table in which user names are corresponding to User specific data. As it is hard for user to recognize User specific data printed on the retrieval sheet KS, it becomes possible to output applicable print accurately when a user name is printed.

The print queue of the HDD 14 in the file server 3 is monitored periodically as to whether data is input from the print server program shown in FIGS. 10 and 11 and its contents, if any, are read and sent as the print command data (2) to the print server 2 via the network. This print command data (2) is composed of the designation of the print server as a destination, the designation of the file server as a sender, Print Job specific data, the print command, the data designating the secret print, the data designating the provision of the retrieval sheet, the print data and the end data.

The print server 2 receives the print command data (2) for each job and executes the image rasterizing on the page memory 46 when necessary. The code data as the print data contained in the print data are converted to bit map data corresponding to the print image according to the resolution of a printer by the printer controller 70. After completing this image rasterizing in a unit of a group of print jobs comprising one to several pages, the print server 2 issues itself a password corresponding to each job if the print data is for the print with secrecy. Simultaneously with the completion of this image rasterizing, the top page made by the file server 3 previously is printed and output as the retrieval sheet KS (3). Further, a user name UN and Print Job specific data JN are printed on the retrieval sheet KS as shown in FIG. 27.

Then, the print server 2 sends an answer data (4) showing the issued password and the completion of image rasterizing together with Print Job specific data to the file server 3 via the network. This answer data (4) is composed of the designation of the file server as a destination, the designation of the print server as a sender, Print Job specific data, the rasterizing completion data and the password.

The CPU 11 of the file server 3 discriminates User specific data as a job requesting user corresponding to Print Job specific data contained in the answer data (4) using the print job comparison table 12a. An answer data (5) is sent to this discriminated user, that is, the terminal 1 via the network. This answer data (5) is composed of a user number as a destination, the file server as a sender, Print Job specific data, the rasterizing completion data and a password.

This answer data (5) is supplied to the controller in the terminal 1 and a password corresponding to a Print Job specific data is displayed on the display unit. The user remembers this password.

Thereafter, the user remembering the password goes to the print server 2 and after confirming that there is no other user near the print server 2, has the scanner 33 scan the print output retrieval sheet KS and also, has the print server 2 read Print Job specific data printed on the retrieval sheet KS and further, by inputting the remembered password through the control panel 24, asks the output of his own print. The print server 2 executes the print output corresponding to Print Job specific data JN read via the scanner 33 and it becomes possible to get the print output with high secrecy.

Figure 28:
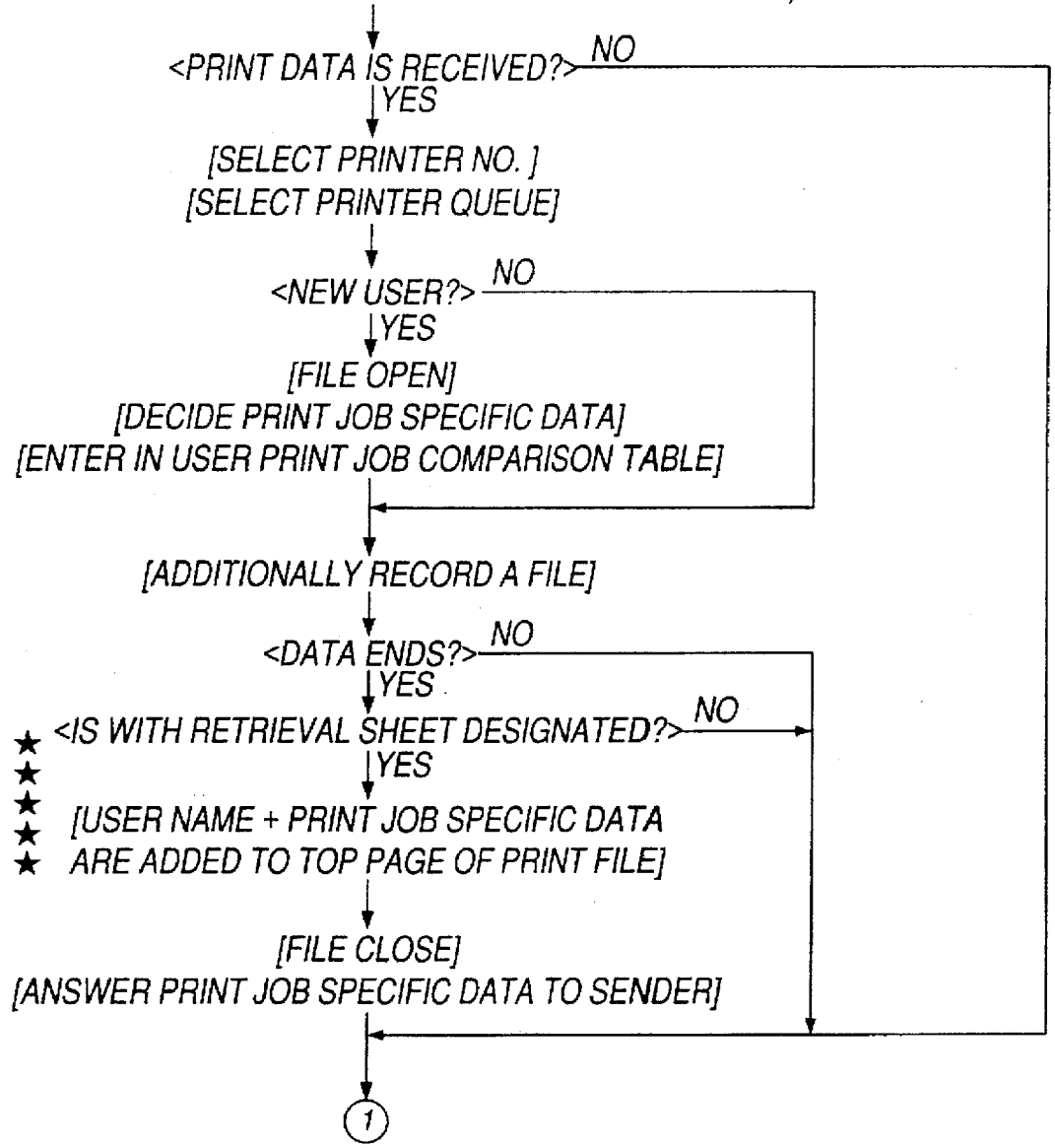
FIG. 28 is a flowchart for explaining the process of secret print in the other embodiment shown in FIG. 26.

Next, the process of the secret print server program in the file server in an embodiment using the retrieval sheet KS will be explained referring to the flowchart shown in FIG. 28. The flowchart shown in FIG. 28 is almost the same as the flowchart shown in FIG. 10, which has been already explained and the portion with the * mark is the operating portion newly added. So, this newly added * portion will be explained and the explanation of the same portions as the flowchart shown in FIG. 10 will be omitted. That is, whether data is completed is checked and if completed, it is also checked if there is the designated data with the retrieval sheet. If there is the designated data with a retrieval sheet, a process to add a top page comprising a user name and Print Job specific data is executed. The print data with this top page added is sent to the print server 2.

Figure 29:
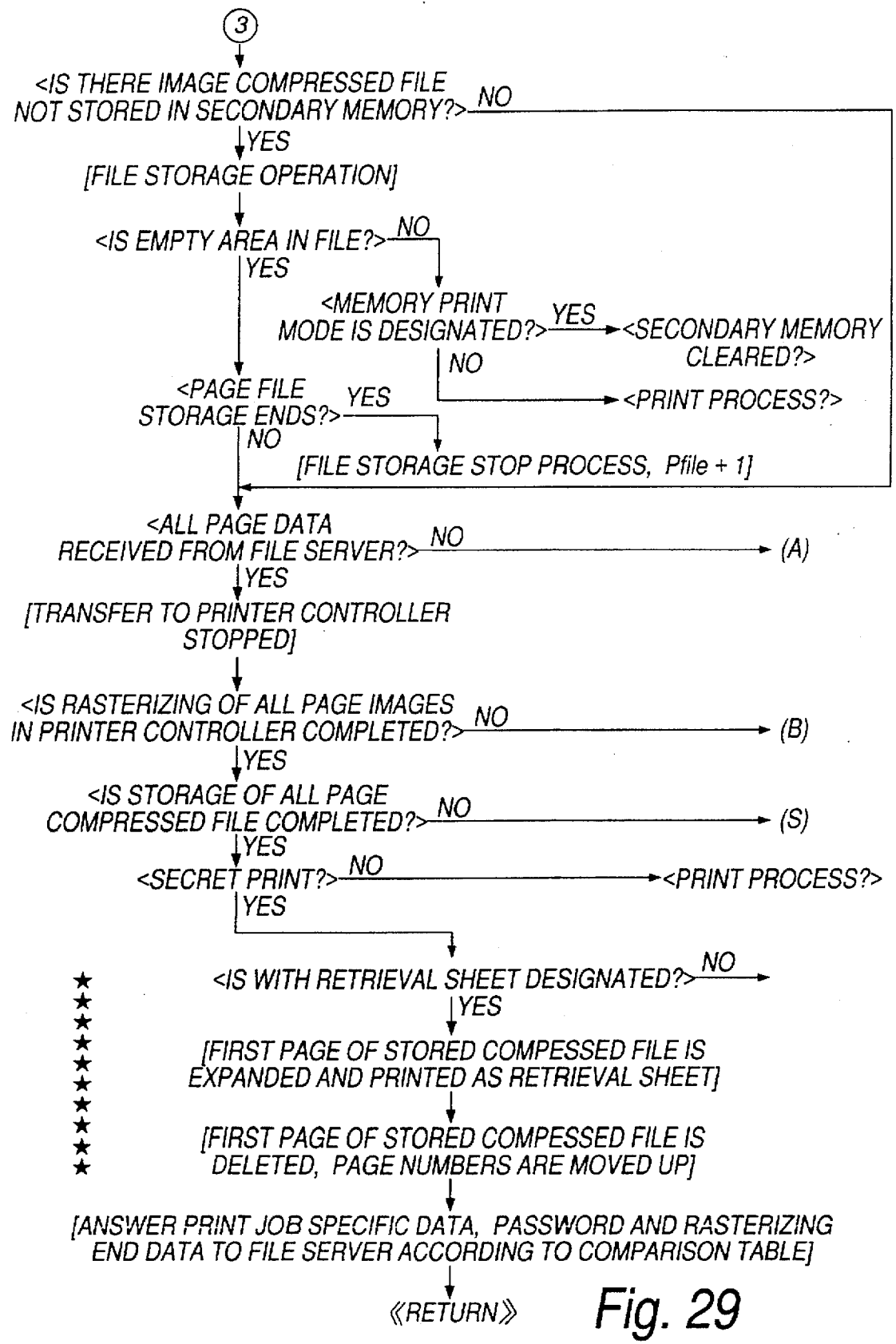
FIG. 29 is a flowchart for explaining the rasterizing process of received print data image in the other embodiment shown in FIG. 26.

Next, the print image rasterizing process in an embodiment using the retrieval sheet KS will be explained referring to FIG. 29. The flowchart shown in FIG. 29 is almost the same as the flowchart shown in FIG. 14 as described above and the portion with the * mark is the operating portion newly added. So, this newly added * portion will be explained and the explanation of the same portion as that in FIG. 14 will be omitted. That is, when the print command data (2) received by the print server 2 contains the designation of the secret print with the retrieval sheet, the first page of the compressed and stored file is expanded and printed as the retrieval sheet. Then, this first page of the compressed and stored file is deleted and the page numbers are moved up. Then, Print Job specific data, a password and rasterizing completed data extracted by referring to the user print job comparison table are answered to the file server. After this answer, the operation is terminated.

Figure 30:
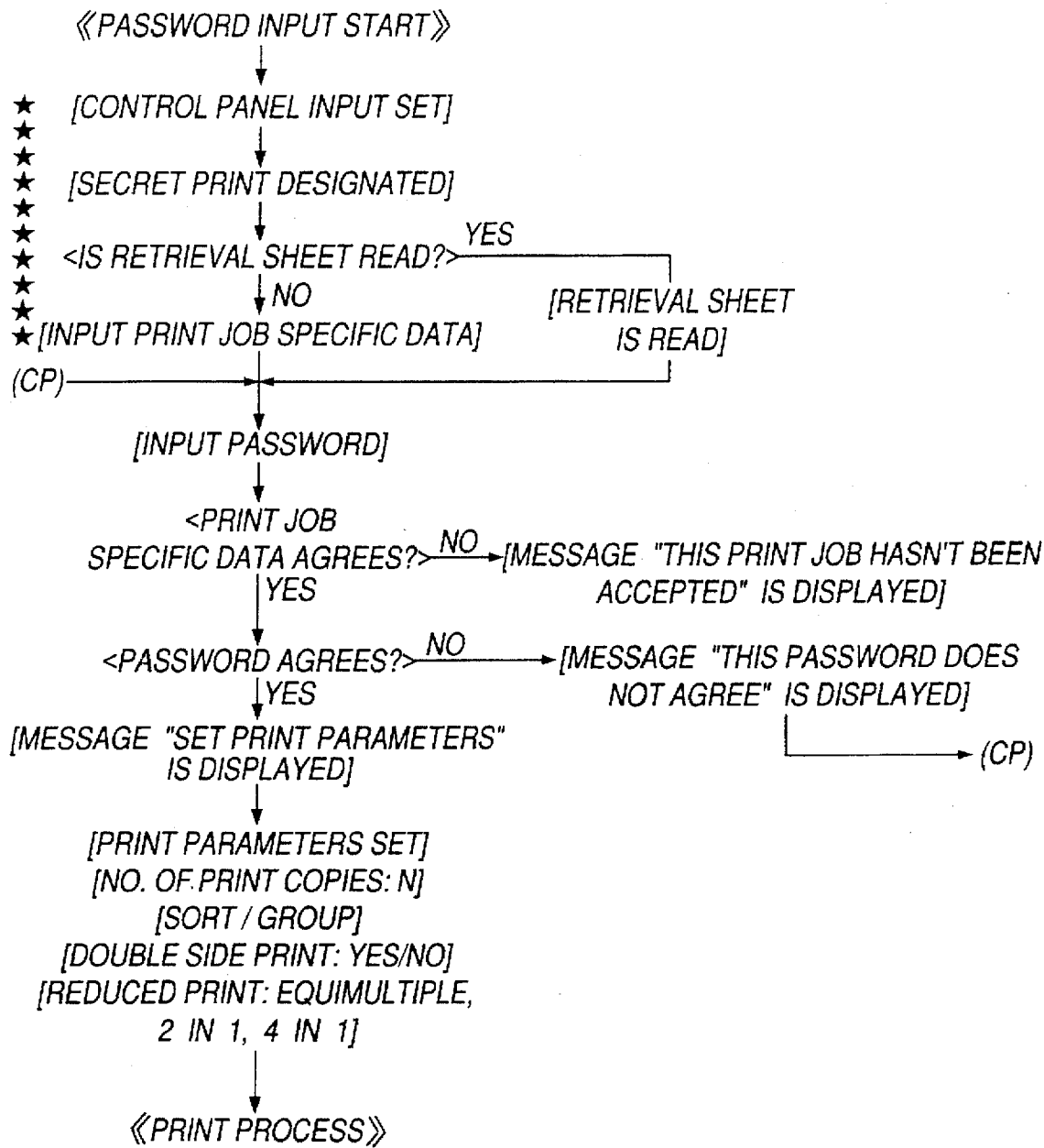
FIG. 30 is a flowchart for explaining the print starting operation in the other embodiment shown in FIG. 26.

Further, the print operation started by inputting a password for the secret printing through the control panel 24 will be explained referring to the flowchart shown in FIG. 30. The flowchart in this FIG. 30 is almost the same as the flowchart shown in FIG. 15 and the portion with the * mark is the operating portion newly added. So, this newly added * portion is explained and the explanation of the same portion as that in FIG. 15 will be omitted. That is, by designating the secret printing from the control panel 24, it is checked if it is specified to read the retrieval sheet KS. If it is so specified, the retrieval sheet KS printed out from the print server 2 is read the scanner 33 (FIG. 3). By reading the retrieval sheet KS, print data is specified. Thereafter, a user inputs a password. If no retrieval sheet KS is available, print data is specified by Print Job specific data which is keyed input from the control panel 24 and then, a user inputs a password.

As described above, in the image forming system where the terminal and the print server are connected via a network having a file server and where print data that is output from the terminal is printed out by the print server, User specific data, data showing secrecy and print data are output from the terminal. The file server accepts User specific data, data showing secrecy and print data supplied from the terminal. Print Job specific data is generated for this accepted User specific data and Print Job specific data is assigned to the data showing secrecy and print data and these data are output to the print server. Further, Print Job specific data is also output to the terminal and the print server accepts Print Job specific data, the data showing secrecy and print data supplied from the file server, and the print server generates a password according to the data showing secrecy. This password is output to the terminal via the print server. When Print Job specific data and the password are input by a user, print data corresponding to the input Print Job specific data is printed if the passwords agree with each other.

Further, User specific data, data showing secrecy and print data are output from the terminal. The file server accepts User specific data, data showing secrecy and print data supplied from the terminal and outputs this accepted User specific data, data showing secrecy and print data to the print server. The print server accepts User specific data, data showing secrecy and print data supplied from the file server. When User specific data is input by a user, print data corresponding to this input User specific data is printed.

Further, User specific data, data showing secrecy, a password and print data are output from the terminal and the file server accepts User specific data, data showing secrecy, a password and print data supplied from the terminal and outputs this accepted User specific data, data showing secrecy, password, print data to the print server. The print server accepts User specific data, data showing secrecy, a password, and print data supplied from the file server. When User specific data and a password are input by a user, print data corresponding to this input, User specific data is printed if the passwords agree with each other.

To save the time and labor for inputting Print Job specific data, the print server outputs a retrieval sheet to a user who directed the secret print. A user name and Print Job specific data are printed on this retrieval sheet. User scans this retrieval sheet by using a scanner to read the user name and Print Job specific data and inputs a password through the control panel of the print server. The print server provides the print output corresponding to Print Job specific data read by the scanner.

Thus, highly secret printing matter can be printed while keeping secrecy by a printer that is commonly used in a network and a printer is prevented from becoming expensive.

As described above in detail, it is possible to provide a network print system that is capable of printing highly secret printing matters while keeping secrecy by a printer that is commonly used on a network and preventing a printer from becoming expensive.

What is claimed is:

1. An image forming apparatus with security comprising:
   means for receiving print data added with secret data from an external equipment;
   means for performing a rasterizing operation for rasterizing the print data received by the receiving means to image data;
   means for storing the image data rasterized by the rasterizing means;
   means for transmitting termination data showing the termination of the rasterizing operation of the rasterizing means to the external equipment to notify the termination of the rasterizing operation to an operator thereof;
   means for inputting data specifying the image data; and
   means for forming an image on an image bearing medium based on the image data stored in the storing means when the specific data is input by the inputting means after the transmitting means transmits the termination data to the external equipment to notify the termination of the rasterizing operation to the operator thereof.

2. An image forming apparatus according to claim 1, wherein the transmitting means includes a display unit to display the termination data.

3. An image forming apparatus according to claim 1, wherein the data specifying image data input to the inputting means includes User specific data.

4. An image forming apparatus system according to claim 1, wherein the data specifying image data input to the inputting means includes User specific data and a password.

5. An image forming apparatus system according to claim 4, wherein the image forming means forms an image on paper when a password corresponding to User specific data input by the inputting means agrees with the password input by the inputting means.

6. An image forming apparatus according to claim 1 further comprising means for directing an edit operation of the image data to obtain a size changed image which is formed by said image forming means on the image bearing medium.

7. An image forming apparatus according to claim 1 further comprising means for printing data specifying the image data on an image bearing medium and the inputting means includes means for reading the data specifying the image data printed on the image bearing medium by the printing means.

8. An image forming system with security including a terminal and a print server connected with the terminal via a network having a file server:
   the terminal having first output means for outputting User specific data, secret data and print data:
   the file server comprising:
      first receiving means for receiving the User specific data, the secret data and the print data from the first output means of the terminal; and
      second output means for outputting the User specific data, the secret data and the print data received by the first receiving means to the print server;
   the print server comprising:
      second receiving means for receiving the User specific data, the secret data and the print data outputted from the second output means of the file server;
      rasterizing means for rasterizing the print data received by the second receiving means to image data;
      third output means for outputting termination data showing termination of the rasterizing operation of the rasterizing means to the terminal;
      first input means for inputting data specifying the image data; and
      image forming means for forming an image on an image bearing medium based on image data corresponding to the data specifying image data out of the image data rasterized by the rasterizing means when the data specifying image data is input by the first input means after said third output means outputs the termination data to the terminal.

9. An image forming system according to claim 8, wherein the print server further comprising:
   fourth output means for outputting a retrieval sheet containing data specifying a user and data specifying a job;
   reading means for reading the data contained in the retrieval sheet;
   second input means for inputting a password; and
   specifying means for specifying the image data based on the password input by the second input means and the data read by the reading means.

10. An image forming system according to claim 8, wherein the terminal includes a display unit to display termination data output by the third output means.

11. An image forming system according to claim 8, wherein the data specifying image data input to the input means includes User specific data.

12. An image forming system according to claim 8, wherein the data specifying image data input to the input means includes User specific data and a password.

13. An image forming system according to claim 12, wherein the image forming means forms an image on an image bearing means when a password corresponding to User specific data input by the input means agrees with the password input by the input means.

14. An image forming system according to claim 8 further comprising means for directing an edit operation of the image data to obtain a size changed image which is formed by said image forming means on the image bearing medium.

15. An image forming system according to claim 8 further comprising means for printing data specifying the image data on an image bearing medium and the input means includes means for reading the data specifying the image data printed on the image bearing means by the printing means.

16. An image forming system with security comprising:
   a network having a file server;

a terminal connected with the network; and
a print server connected with the terminal via the network;
the terminal including:
  first output means for outputting User specific data, data showing secrecy and print data;
  first receiving means for receiving a password for print data containing Print Job specific data corresponding to User specific data supplied from the file server and data showing the secrecy in response to the output from the first output means; and
  display means for displaying the Print Job specific data, and the password received by the first receiving means;
the file server including:
  second receiving means for receiving User specific data, data showing secrecy and print data supplied from the terminal;
  first generating means for generating Print Job specific data corresponding to the User specific data received by the second receiving means;
  second output means for outputting the Print Job specific data generated by the first generating means and the User specific data to the terminal;
  third output means for outputting the Print Job specific data generated by the first generating means together with the data showing secrecy and the print data received by the second receiving means to the print server;
  third receiving means for receiving the password and Print Job specific data supplied from the print server in response to the output from the third output means;
  judging means for judging the User specific data corresponding to the Print Job specific data received by the third receiving means; and
  fourth output means for outputting the User specific data judged by the judging means and the password received by the third receiving means to the terminal,
the print server including:
  fourth receiving means for receiving the Print Job specific data, data showing secrecy and print data supplied from the file server;
  second generating means for generating a password for the print data given with data showing secrecy received by the fourth receiving means;
  rasterizing means for rasterizing the print data received by the fourth receiving means to image data;
  fifth output means for outputting the password generated by the second generating means together with the Print Job specific data received by the fourth receiving means and termination data showing the termination of the rasterizing operation to the file server when the rasterizing to image data by the rasterizing means is terminated;
  first input means for inputting Print Job specific data and a password of print data to be printed; and
  image forming means for forming an image on an image bearing medium based on the image data rasterized by the rasterizing means when the password for Print Job specific data input by the first input means agrees with the password input by the first input means.

17. An image forming system according to claim 16, wherein the print server further comprising:
  sixth output means for outputting a retrieval sheet containing data specifying a user and data specifying a job;
  reading means for reading the data contained in the retrieval sheet;
  second input means for inputting a password; and
  specifying means for specifying the image data based on the password input by the second input means and the data read by the reading means.

18. An image forming system according to claim 16, wherein the terminal includes a display unit to display termination data output by the third output means.

19. An image forming system according to claim 16 further comprising means for directing an edit operation of the image data to obtain a size changed image which is formed by said image forming means on the image bearing medium.

20. An image forming system with security comprising:
a network having a file server;
a terminal connected with the network; and
a print server connected with the terminal via the network;
the terminal including:
  first directing means for directing a printing of print data with secrecy or a printing of print data without secrecy; and
  first output means for outputting User specific data, data showing secrecy and print data when the printing of print data with secrecy is directed by the directing means and for outputting User specific data and print data when the printing of print data without secrecy is directed by the directing means;
the file server including:
  first receiving means for receiving the User specific data, data showing secrecy and print data or the User specific data and data containing print data supplied from the terminal; and
  second output means for outputting the data received by the first receiving means to the print server;
the print server including:
  second receiving means for receiving the data supplied from the file server;
  rasterizing means for rasterizing print data out of the data received by the second receiving means to image data;
  third output means for outputting termination data showing the termination of the rasterizing operation of the rasterizing means to the terminal;
  judging means for judging whether print data with or without secrecy is to be printed according to whether the data received by the first receiving means is provided with data showing secrecy;
  first image forming means for forming an image on an image bearing medium based on the image data rasterized when the printing of print data without secrecy is judged by the judging means;
  second directing means for directing input of data specifying the image data when the judging means judges the printing of print data with secrecy;
  input means for inputting the data specifying the image data according to the direction by the second directing means; and second image forming means for forming an image on an image bearing medium based on the rasterized image data corresponding to specific data when the specific data is input by the first input means after the termination data is output to the terminal by the third output means.

21. An image forming system according to claim 20, wherein the print server further comprising:

fourth output means for outputting a retrieval sheet containing data specifying a user and data specifying a job;

reading means for reading the data contained in the retrieval sheet;

second input means for inputting a password; and specifying means for specifying the image data based on the password input by the second input means and the data read by the reading means.

22. An image forming system according to claim 20, wherein the terminal includes a display unit to display termination data output by the third output means.

23. An image forming system according to claim 20, wherein the data specifying image data input to the input means includes User specific data.

24. An image forming system according to claim 20, wherein the data specifying image data input to the input means includes User specific data and a password.

25. An image forming system according to claim 24, wherein the second image forming means forms an image on an image bearing medium when a password corresponding to User specific data input by the input means agrees with the password input by the input means.

26. An image forming system according to claim 20 further comprising third directing means for directing an edit operation of the image data to obtain a size changed image which is formed by one of said first or second image forming means on the image bearing medium.

27. An image forming method with security including a terminal and a print server connected with the terminal via a network having a file server, the method comprising steps of:

at the terminal:
outputting User specific data, data showing security and print data from the terminal;

at the file server:
receiving the User specific data, the data showing secrecy and the print data from the terminal; and
outputting the User specific data, the data showing secrecy and the print data to the print server;

at the print server:
receiving the User specific data, the data showing secrecy and the print data outputted from the file server;
rasterizing outputting data to image data;
outputting termination data showing termination of the rasterizing step to the terminal;
inputting data specifying the image data; and
forming image on an image bearing medium based on image data corresponding to the data specifying image data out of the image data rasterized by the rasterizing step when the data specifying image data is input by the inputting step.

* * * * *